(12) United States Patent
Aoki et al.

(10) Patent No.: US 6,762,916 B2
(45) Date of Patent: Jul. 13, 2004

(54) THIN-FILM MAGNETIC HEAD WITH LOW BARKHAUSEN NOISE AND FLOATING-TYPE MAGNETIC HEAD THEREWITH

(75) Inventors: Daigo Aoki, Niigata-ken (JP); Yoshihiko Kakihara, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 417 days.

(21) Appl. No.: 09/751,267

(22) Filed: Dec. 29, 2000

(65) Prior Publication Data

US 2001/0006446 A1 Jul. 5, 2001

(30) Foreign Application Priority Data

Jan. 5, 2000 (JP) .................................. 2000-000520

(51) Int. Cl.[7] .............................................. G11B 5/30
(52) U.S. Cl. .............................................. 360/324.12
(58) Field of Search .................. 360/324.12, 327.2, 360/327.23, 119, 121, 324.1

(56) References Cited

U.S. PATENT DOCUMENTS

| | | | |
|---|---|---|---|
| 5,608,593 A | 3/1997 | Kim et al. | 360/324.12 |
| 6,111,722 A | * 8/2000 | Fukuzawa et al. | 360/324.12 |
| 6,122,151 A | 9/2000 | Saito et al. | 360/324.12 |
| 6,128,167 A | 10/2000 | Saito et al. | 360/324.12 |
| 6,157,526 A | * 12/2000 | Watanabe et al. | 360/324.12 |
| 6,381,107 B1 | * 4/2002 | Redon et al. | 360/324.2 |
| 6,462,918 B2 | * 10/2002 | Mukouyama | 360/324.12 |
| 6,583,970 B1 | * 6/2003 | Sakata | 360/324.12 |

FOREIGN PATENT DOCUMENTS

| | | |
|---|---|---|
| JP | 7-220246 | 8/1995 |
| JP | 9-016918 | 1/1997 |
| JP | 9-73611 | 3/1997 |
| JP | 9-153652 | 9/1997 |
| JP | 10-112562 | 4/1998 |
| JP | 10-177706 | 6/1998 |
| JP | 10-284321 | 10/1998 |
| JP | 11-232616 | 8/1999 |
| JP | 11-345407 | 12/1999 |

* cited by examiner

Primary Examiner—Tianjie Chen
(74) Attorney, Agent, or Firm—Brinks Hofer Gilson & Lione

(57) ABSTRACT

A thin-film magnetic head includes a spin-valve thin-film magnetic element, first and second insulating layers, and first and second shielding layers. The spin-valve thin-film magnetic element includes a free magnetic layer, a nonmagnetic conductive layer, a pinned magnetic layer, an antiferromagnetic layer, a pair of bias layers, and a pair of conductive layers. The pair of conductive layers is located on one side in the thickness direction of the free magnetic layer, and the pair of bias layers is located on the other side in the thickness direction of the free magnetic layer, is disposed on both sides in the track width direction of at least a portion of the second insulating layer, and is in contact with the free magnetic layer.

11 Claims, 11 Drawing Sheets

THIN-FILM MAGNETIC HEAD WITH LOW BARKHAUSEN NOISE AND FLOATING-TYPE MAGNETIC HEAD THEREWITH

BACKGROUND OF THE INVENTION

1. Field of the Invention

The present invention relates to a thin-film magnetic head and to a floating-type magnetic head provided with the thin-film magnetic head.

2. Description of the Related Art

As magnetoresistive-type thin-film magnetic heads, magnetoresistive (MR) heads provided with elements exhibiting a magnetoresistive effect, and giant magnetoresistive (GMR) heads provided with elements exhibiting a giant magnetoresistive effect, are known.

In the GMR head, the element exhibiting the giant magnetoresistive effect has a multilayered structure. There are several types of multilayered structure for producing the giant magnetoresistive effect. One example thereof is a spin-valve thin-film magnetic element provided with at least a free magnetic layer, a pinned magnetic layer, and a nonmagnetic layer, in which the structure is relatively simple, and the resistance variation ratio in an external magnetic field is increased. Examples of spin-valve thin-film magnetic elements are a single spin-valve thin-film magnetic element and a dual spin-valve thin-film magnetic element.

In order to align the magnetization direction of the free magnetic layer, a hard bias method or an exchange bias method is used. Recently, as the magnetic recording density is increased, the exchange bias method which is suitable for track narrowing is predominantly used.

FIG. 17 shows a thin-film magnetic head 501 provided with a conventional single spin-valve thin-film magnetic element 502 using the exchange bias method.

The thin-film magnetic head 501 is a read-only head, in which a pair of shielding layers 507 and 508 is deposited on both sides in the thickness direction of the spin-valve thin-film magnetic element 502 with insulating layers 505 and 506 therebetween, respectively.

Additionally, in FIG. 17, the Z direction corresponds to the traveling direction of a magnetic recording medium, the Y direction corresponds to the direction of a fringing magnetic field from the magnetic recording medium, and the X1 direction is the track width direction of the thin-film magnetic head 501.

The spin-valve thin-film magnetic element 502 is a so-called "bottom-type" single spin-valve thin-film magnetic element, in which one each of an antiferromagnetic layer, a pinned magnetic layer, a nonmagnetic conductive layer, and a free magnetic layer are deposited in that order.

In the spin-valve thin-film magnetic element 502, the insulating layer 506 composed of $Al_2O_3$ or the like is deposited on the lower shielding layer 508, and an antiferromagnetic layer 512, a pinned magnetic layer 513, a nonmagnetic conductive layer 514 composed of Cu or the like, and a free magnetic layer 515 are deposited on the insulating layer 506 in that order.

A pair of bias layers 516 is deposited on the free magnetic layer 515 with a separation therebetween in the X1 direction.

A pair of conductive layers 517 composed of Cu or the like is further deposited on the bias layers 516, and the insulating layer 505 composed of $Al_2O_3$ or the like is deposited over the conductive layers 517 and the free magnetic layer 515.

The upper shielding layer 507 is deposited on the insulating layer 505.

The antiferromagnetic layer 512 is composed of an antiferromagnetic material, such as a PtMn alloy, and an exchange coupling magnetic field (exchange anisotropic magnetic field) is produced at the interface between the pinned magnetic layer 513 and the antiferromagnetic layer 512, thus pinning the magnetization direction of the pinned magnetic layer 513 in the Y direction.

The bias layers 516 are composed of an antiferromagnetic material, such as an IrMn alloy, and an exchange coupling magnetic field (exchange anisotropic magnetic field) is produced at the interface between the bias layers 516 and the free magnetic layer 515. The exchange coupling magnetic field aligns the magnetization direction of the free magnetic layer 515 in the X1 direction, i.e., the free magnetic layer 515 is aligned in a single-domain state, thus suppressing Barkhausen noise.

Accordingly, the magnetization direction of the free magnetic layer 515 and the magnetization direction of the pinned magnetic layer 513 are orthogonal to each other.

Since the pair of bias layers 516 are formed with a separation therebetween, a portion of the free magnetic layer 515 is not covered by the bias layer 516, and this portion corresponds to a track section G2 of the thin-film magnetic head 501.

In the thin-film magnetic head 501, the magnetization direction of the free magnetic layer 515, which is aligned in the X1 direction, is changed due to a fringing magnetic field from a recording medium, such as a hard disk, and the electrical resistance of the spin-valve thin-film magnetic element 502 is changed because of the relationship between the magnetization direction of the free magnetic layer 515 and the magnetization direction of the pinned magnetic layer 513, which is pinned in the Y direction, and thus the fringing magnetic field from the magnetic medium is detected by a change in voltage due to the change in the electrical resistance.

However, in the conventional thin-film magnetic head 501, since the conductive layers 517 for applying a sensing current to the free magnetic layer 515 are deposited on the pair of bias layers 516, the sensing current flows in the bias layers 516. Since the bias layers 516, which are composed of the antiferromagnetic material, such as an IrMn alloy, have a high resistivity, when the sensing current flows in the bias layers 516, the temperature of the spin-valve thin-film magnetic element 502 may be increased.

If the temperature of the spin-valve thin-film magnetic element 502 is increased, the magnetization of the free magnetic layer 515 which is aligned by the bias layers 516 becomes disordered, resulting in an increase in Barkhausen noise.

Since the sensing current flows in the high-resistivity bias layers 516, the resistance of the spin-valve thin-film magnetic element 502 itself is increased, resulting in a decrease in reading output of the thin-film magnetic head 501.

SUMMARY OF THE INVENTION

Accordingly, it is an object of the present invention to provide a thin-film magnetic head, in which Barkhausen noise is decreased and reading output is increased by preventing a rise in the temperature of a spin-valve thin-film magnetic element, and it is another object of the present invention to provide a floating-type magnetic head provided with the thin-film magnetic head.

In one aspect, a thin-film magnetic head, in accordance with the present invention, includes a spin-valve thin-film magnetic element, and includes a first insulating layer and a second insulating layer each deposited on a side in the thickness direction of the spin-valve thin-film magnetic element, and a first shielding layer and a second shielding layer in contact with the first insulating layer and the second insulating layer, respectively. The spin-valve thin-film magnetic element includes a free magnetic layer, a nonmagnetic conductive layer in contact with the free magnetic layer, the nonmagnetic conductive layer being located on one side in the thickness direction of the free magnetic layer, a pinned magnetic layer in contact with the nonmagnetic conductive layer, an antiferromagnetic layer in contact with the pinned magnetic layer, the antiferromagnetic layer pinning the magnetization direction of the pinned magnetic layer, a pair of bias layers for aligning the magnetization direction of the free magnetic layer, and a pair of conductive layers for applying a sensing current to the free magnetic layer. The pair of conductive layers is located on one side in the thickness direction of the free magnetic layer. The pair of bias layers is located on the other side in the thickness direction of the free magnetic layer, is disposed on both sides in the track width direction of at least a portion of the second insulating layer, and is in contact with the free magnetic layer.

In another aspect, a thin-film magnetic head, in accordance with the present invention, includes a spin-valve thin-film magnetic element, and includes a first insulating layer and a second insulating layer each deposited on a side in the thickness direction of the spin-valve thin-film magnetic element, and a first shielding layer and a second shielding layer in contact with the first insulating layer and the second insulating layer, respectively. The spin-valve thin-film magnetic element includes a free magnetic layer; a first nonmagnetic conductive layer, a first pinned magnetic layer, and a first antiferromagnetic layer deposited on one side in the thickness direction of the free magnetic layer; a second nonmagnetic conductive layer, a second pinned magnetic layer, and a second antiferromagnetic layer deposited on the other side in the thickness direction of the free magnetic layer; a pair of conductive layers for applying a sensing current to the free magnetic layer; and a pair of bias layers in contact with the free magnetic layer, the pair of bias layers aligning the magnetization direction of the free magnetic layer. The pair of conductive layers is located on one side in the thickness direction of the free magnetic layer. The pair of bias layers is located on the other side in the thickness direction of the free magnetic layer, is disposed on both sides in the track width direction of at least a portion of the second insulating layer, and is in contact with the free magnetic layer.

Additionally, as the portion of the second insulating layer, for example, a protrusion protruding from the second insulating layer toward the spin-valve thin-film magnetic element may be mentioned.

In such a thin-film magnetic head, since the pair of conductive layers is located on one side in the thickness direction of the free magnetic layer and the pair of bias layers is located on the other side in the thickness direction of the free magnetic layer, the sensing current applied from the conductive layer to the free magnetic layer does not pass through the bias layer having a high resistivity, and the rise in the temperature of the spin-valve thin-film magnetic element is suppressed, and thus the magnetization of the free magnetic layer does not become disordered.

Also, the reading output of the thin-film magnetic head is not decreased.

Furthermore, since the pair of bias layers is disposed on both sides in the track width direction of at least a portion of the second insulating layer, it is possible to narrow the gap in the thin-film magnetic head.

Additionally, although the pinned magnetic layer may have a single-layer structure, the pinned magnetic layer may have a structure in which the pinned magnetic layer is divided into two layers by a nonmagnetic layer composed of a nonmagnetic material and the resulting two layers are magnetically coupled to produce a ferrimagnetic state.

Additionally, although the free magnetic layer may have a single-layer structure, the free magnetic layer may have a structure in which the free magnetic layer is divided into two layers by a nonmagnetic intermediate layer composed of a nonmagnetic material and the resulting two layers are magnetically coupled to produce a ferrimagnetic state.

Furthermore, a diffusion-inhibiting layer for inhibiting diffusion between the free magnetic layer and the nonmagnetic conductive layer may be provided on the free magnetic layer in the portion in contact with the nonmagnetic conductive layer.

In the thin-film magnetic head of the present invention, preferably, the pair of bias layers is disposed on both sides in the track width direction of the second insulating layer, the pair of bias layers is composed of an antiferromagnetic insulating material, and the second shielding layer is in contact with the pair of bias layers and the second insulating layer.

In such a thin-film magnetic head, since the pair of bias layers composed of the antiferromagnetic insulating material is located on both sides in the track width direction of the second insulating layer, it is possible to narrow the gap of the thin-film magnetic head.

Also, since the second shielding layer is in contact with the bias layers composed of the insulating material and the second insulating layer, it is possible to insulate the second shielding layer and the spin-valve thin-film magnetic element from each other.

In the thin-film magnetic head of the present invention, preferably, the second insulating layer is provided with an insulating protrusion protruding toward the spin-valve magnetic element, the pair of bias layers is disposed on both sides in the track width direction of the insulating protrusion, and the pair of bias layers is composed of an antiferromagnetic insulating material or an antiferromagnetic conductive material.

In such a thin-film magnetic head, since the pair of bias layers is disposed on both sides in the track width direction of the insulating protrusion of the second insulating layer, the bias layers are partially or entirely embedded in the second insulating layer.

Since the bias layers are composed of the antiferromagnetic conductive material, which can provide a strong exchange coupling magnetic field, it is possible to reduce the thickness of the bias layers.

Accordingly, it is possible to reduce the thickness of the thin-film magnetic head itself, thus enabling narrowing of the gap.

In the thin-film magnetic head of the present invention, preferably, the second shielding layer is provided with a shielding protrusion protruding toward the spin-valve thin-film magnetic element, the second insulating layer is disposed between the shielding protrusion and the spin-valve thin-film magnetic element, the pair of bias layers is disposed on both sides in the track width direction of the shielding protrusion and the second insulating layer, and the bias layers are composed of an antiferromagnetic insulating material.

In such a thin-film magnetic head, since the pair of bias layers is disposed on both sides in the track width direction of the second insulating layer and the shielding protrusion of the second shielding layer, the bias layers are partially or entirely embedded in the second insulating layer and the second shielding layer. Consequently, it is possible to reduce the thickness of the thin-film magnetic head itself, thus enabling narrowing of the gap.

Also, since the insulating bias layers and the second insulating layer are disposed between the second shielding layer and the spin-valve thin-film magnetic element, it is possible to insulate the second shielding layer and the spin-valve thin-film magnetic element from each other.

In the thin-film magnetic head of the present invention, preferably, the second shielding layer is provided with a shielding protrusion protruding toward the spin-valve thin-film magnetic element, the second insulating layer is disposed between the second shielding layer and the spin-valve thin-film magnetic element, the pair of bias layers is disposed on both sides in the track width direction of the shielding protrusion, and the bias layers are composed of an antiferromagnetic insulating material or an antiferromagnetic conductive material.

In such a thin-film magnetic head, since the pair of bias layers is disposed on both sides in the track width direction of the shielding protrusion of the second shielding layer, the bias layers are partially or entirely embedded in the second shielding layer. Consequently, it is possible to reduce the thickness of the thin-film magnetic head itself, thus enabling narrowing of the gap.

Since the bias layers are composed of the antiferromagnetic conductive material, which can provide a strong exchange coupling magnetic field, it is possible to reduce the thickness of the bias layers, and the thin-film magnetic head itself can be reduced in thickness, thus enabling narrowing of the gap.

In the thin-film magnetic head in which the nonmagnetic conductive layer, etc., are deposited on each side in the thickness direction of the free magnetic layer, preferably, the pair of bias layers is located on both sides in the track width direction of the second nonmagnetic conductive layer, the second pinned magnetic layer, and the second antiferromagnetic layer, and the pair of bias layers is in contact with the free magnetic layer.

In such a thin-film magnetic head, since the bias layers are located on both sides in the track width direction of the second nonmagnetic conductive layer, the second pinned magnetic layer, and the second antiferromagnetic layer, it is possible to reduce the thickness of the spin-valve thin-film magnetic element itself, thus enabling narrowing of the gap in the thin-film magnetic head.

In the thin-film magnetic head in which the nonmagnetic conductive layer, etc., are deposited on one side in the thickness direction of the free magnetic layer, preferably, the pair of conductive layers is located on both sides in the track width direction of the nonmagnetic conductive layer, the pinned magnetic layer, and the antiferromagnetic layer, and the pair of conductive layers is in contact with the free magnetic layer.

In such a thin-film magnetic head, since the conductive layers are located on both sides in the track width direction of the nonmagnetic conductive layer, the pinned magnetic layer, and the antiferromagnetic layer, it is possible to reduce the thickness of the spin-valve thin-film magnetic element itself, thus enabling narrowing of the gap in the thin-film magnetic head.

Also, since the conductive layers are in contact with the free magnetic layer, it is possible to efficiently apply a sensing current to the free magnetic layer.

In the thin-film magnetic head in which the nonmagnetic conductive layer, etc., are deposited on each side in the thickness direction of the free magnetic layer, preferably, the pair of conductive layers is located on both sides in the track width direction of the first nonmagnetic conductive layer, the first pinned magnetic layer, and the first antiferromagnetic layer, and the pair of conductive layers is in contact with the free magnetic layer.

In such a thin-film magnetic head, since the conductive layers are located on both sides in the track width direction of the first nonmagnetic conductive layer, the first pinned magnetic layer, and the first antiferromagnetic layer, it is possible to reduce the thickness of the spin-valve thin-film magnetic element itself, thus enabling narrowing of the gap in the thin-film magnetic head.

Also, since the conductive layers are in contact with the free magnetic layer, it is possible to efficiently apply a sensing current to the free magnetic layer.

Preferably, the antiferromagnetic insulating material is one of NiO and $\alpha$-$Fe_2O_3$.

Preferably, the antiferromagnetic conductive material is one of an X-Mn alloy and an X-Mn-X' alloy, where X is at least one element selected from the group consisting of Pt, Pd, Ru, Ir, Rh, and Os, and where X' is at least one element selected from the group consisting of Pd, Cr, Ni, Ne, Ar, Xe, and Kr.

In another aspect, a floating-type magnetic head, in accordance with the present invention, includes a slider and any one of thin-film magnetic heads described above.

In accordance with such a floating-type magnetic head, since the thin-film magnetic head, in which Barkhausen noise is decreased, reading output is increased and the gap can be narrowed, is provided, it is possible to construct a floating-type magnetic head which has high sensitivity to an external magnetic field, has high output and is suitable for higher recording densities.

DESCRIPTION OF THE PREFERRED EMBODIMENTS

Figure 1:
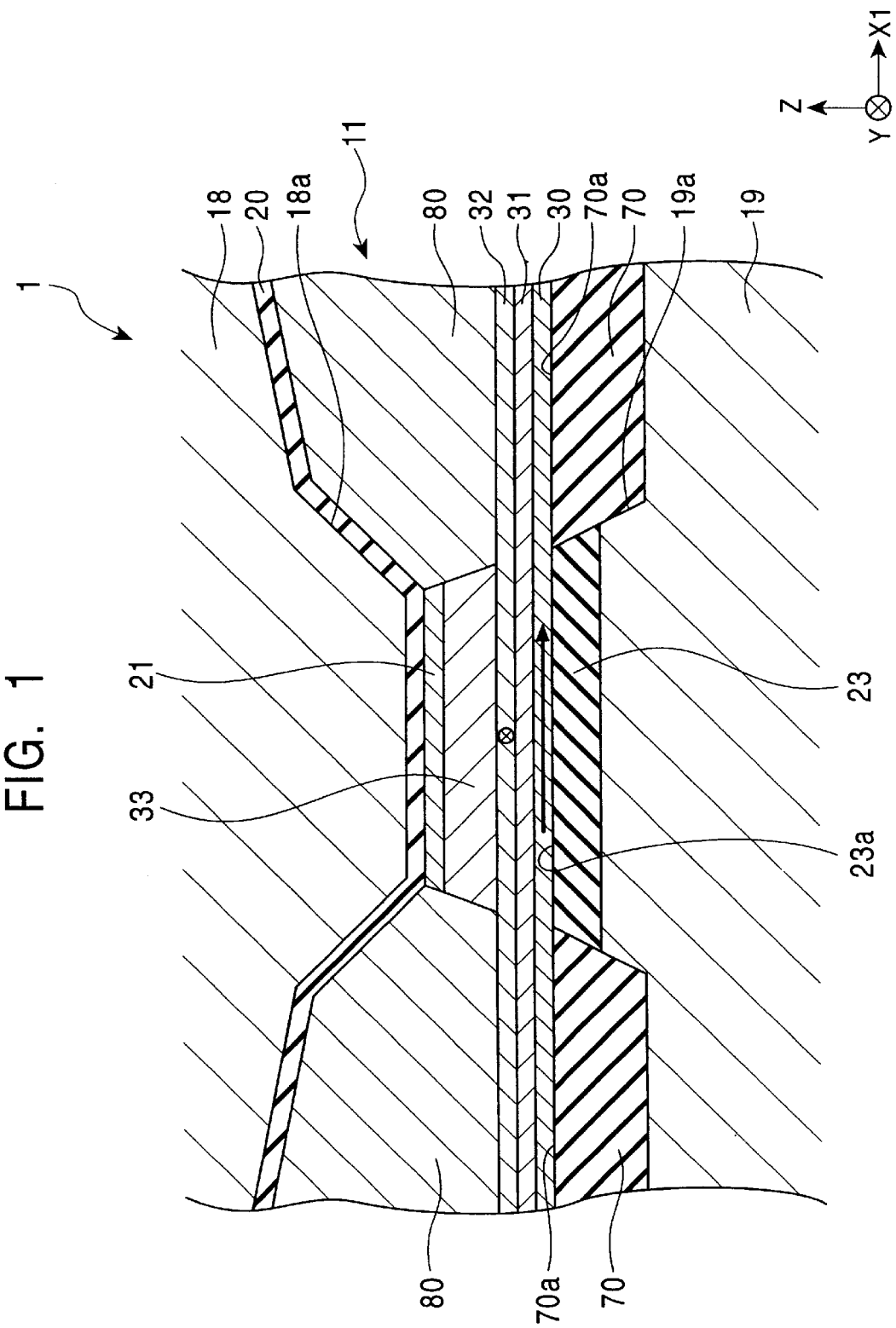
FIG. 1 is a sectional view which schematically shows a thin-film magnetic head, viewed from a surface facing a recording medium, in a first embodiment of the present invention.

The embodiments of the present invention will be described with reference to FIGS. 1 to 16.

In FIGS. 1 to 16, the Z direction in the drawing corresponds to the travelling direction of a magnetic recording medium, the Y direction in the drawing corresponds to the direction of a fringing magnetic field from the magnetic recording medium, and the X1 direction is the track width direction of a spin-valve thin-film magnetic element.

FIG. 1 is a sectional view which schematically shows a thin-film magnetic head 1, viewed from the side of a magnetic recording medium, in a first embodiment of the present invention.

Figure 2:
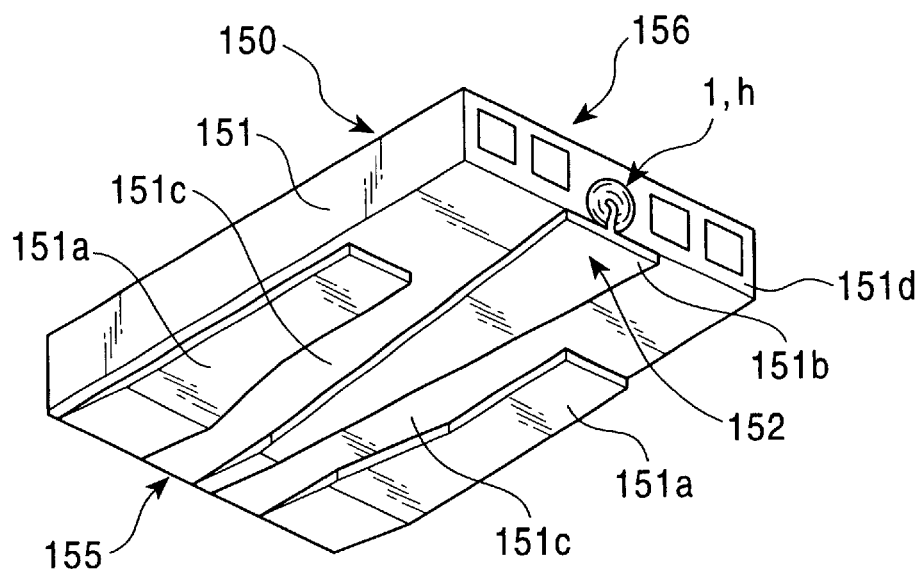
FIG. 2 is a perspective view showing a floating-type magnetic head in the first embodiment of the present invention.
Figure 3:
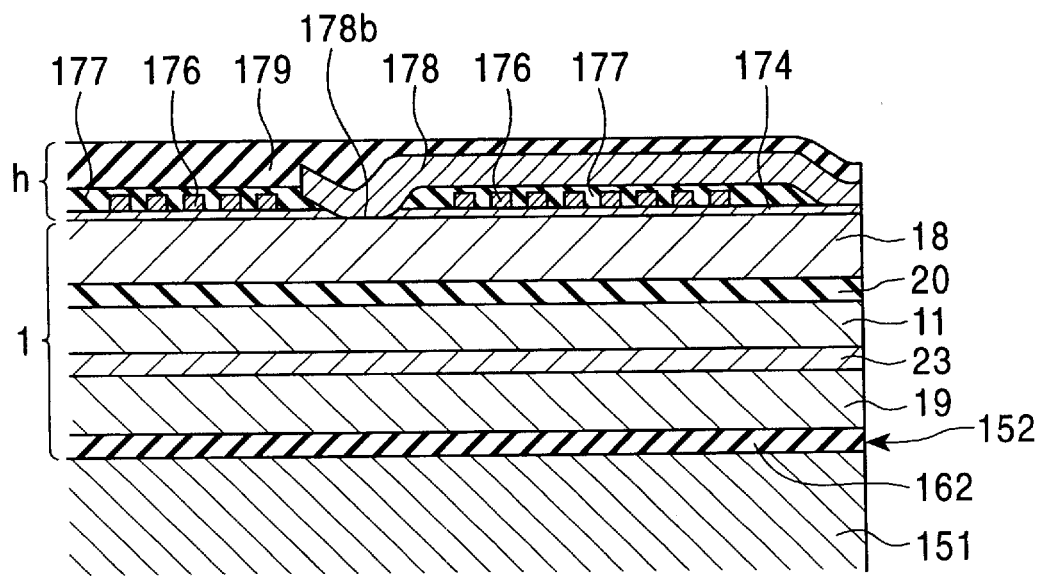
FIG. 3 is a sectional view showing a principal portion of the floating-type magnetic head shown in FIG. 2.

FIGS. 2 and 3 show a floating-type magnetic head 150 provided with the thin-film magnetic head 1.

The floating-type magnetic head 150 shown in FIG. 2 includes a slider 151, the thin-film magnetic head 1 in accordance with the present invention provided on an end 151d of the slider 151, and an inductive head h. Reference numeral 155 represents the leading side and reference numeral 156 represents the trailing side of the slider 151. On a surface 152 of the slider 151, which faces the medium, rails 151a and 151b are formed, and air grooves 151c are formed between the rails 151a and 151b.

As shown in FIGS. 2 and 3, the thin-film magnetic head 1 of the present invention is deposited on an insulating layer 162 formed on the end 151d of the slider 151. The thin-film magnetic head 1 includes a lower shielding layer 19 deposited on the insulating layer 162; a lower insulating layer 23 deposited on the lower shielding layer 19; a spin-valve thin-film magnetic element 11 in accordance with the present invention, which is formed on the lower insulating layer 23 and which is exposed at the surface 152 facing the medium; an upper insulating layer 20 covering the spin-valve thin-film magnetic element 11; and an upper shielding layer 18 covering the upper insulating layer 20.

That is, in the thin-film magnetic head 1 of the present invention, the upper and lower insulating layers 20 and 23 and the upper and lower shielding layers 18 and 19 are deposited on both sides in the thickness direction of the spin-valve thin-film magnetic element 11, respectively.

The upper shielding layer 18 also acts as a lower core layer of the inductive head h described below.

The inductive head h includes the lower core layer (upper shielding layer) 18; a gap layer 174 deposited on the lower core layer 18; a coil 176; an upper insulating layer 177 covering the coil 176; and an upper core layer 178 which is joined to the gap layer 174 and which is joined to the lower core layer 18 on the side of the coil 176.

The coil 176 is spirally patterned, and a base 178b of the upper core layer 178 is magnetically coupled to the lower core layer 18 in substantially the center of the coil 176.

A core protection layer 179 composed of alumina or the like is deposited on the upper core layer 178.

As shown in FIG. 1, the thin-film magnetic head 1 includes the spin-valve magnetic element 11, and the upper and lower insulating layers 20 and 23 and the upper and lower shielding layers 18 and 19 which are deposited on both sides in the thickness direction of the spin-valve thin-film magnetic element 11. The upper and lower insulating layers 20 and 23 are composed of alumina or the like, and the upper and lower shielding layers 18 and 19 are composed of a magnetic alloy.

As shown in FIG. 1, the lower shielding layer 19 is provided with a shielding protrusion 19a protruding toward the spin-valve thin-film magnetic element 11. The lower insulating layer 23 is deposited on the shielding protrusion 19a of the lower shielding layer 19.

The spin-valve thin-film magnetic element 11 is a so-called "top-type" single spin-valve thin-film magnetic element, in which one each of a free magnetic layer, a nonmagnetic conductive layer, a pinned magnetic layer, and an antiferromagnetic layer are deposited, in that order. The spin-valve thin-film magnetic element 11 is also provided with conductive layers for applying a sensing current to the free magnetic layer, and a pair of bias layers for aligning the magnetization of the free magnetic layer.

In the spin-valve thin-film magnetic element 11, a nonmagnetic conductive layer 31, a pinned magnetic layer 32, and an antiferromagnetic layer 33 are deposited, in that order on one side in the thickness direction of a free magnetic layer 30 (on the side in the Z direction in the drawing). The antiferromagnetic layer 33 is formed so as to have a substantially trapezoidal cross section with a width corresponding to a track width. A pair of conductive layers 80 for applying a sensing current to the free magnetic layer 30 is disposed on both sides in the X1 direction of the antiferromagnetic layer 33.

The conductive layers 80 are disposed on one side in the thickness direction of the free magnetic layer 30 and are in contact with the pinned magnetic layer 32.

Additionally, the conductive layers 80 are preferably composed of Cr, Ta, Au, Cu, or the like.

A cap layer 21 composed of Ta or the like is deposited on the antiferromagnetic layer 33, and the upper insulating layer 20 for covering the conductive layers 80 and the cap layer 21 is further deposited.

The upper shielding layer 18 is deposited on the upper insulating layer 20.

A pair of bias layers 70, which is composed of an antiferromagnetic material, is disposed on the other side in the thickness direction of the free magnetic layer 30 (on a side opposite to the Z direction) and on both sides in the track width direction of the shielding protrusion 19a of the lower shielding layer 19 and the lower insulating layer 23.

The bias layers 70 are deposited so that an upper surface 70a thereof is level with an upper surface 23a of the lower insulating layer 23, and are in contact with the free magnetic layer 30.

As described above, the entirety of the pair of bias layers 70 is disposed on both sides in the X1 direction of the lower insulating layer 23 and the shielding protrusion 19a of the lower shielding layer 19, i.e., the pair of bias layers 70 is embedded in the lower insulating layer 23 and the lower shielding layer 19.

The lower shielding layer 19 is in contact with the bias layers 70 and the lower insulating layer 23. Consequently, the free magnetic layer 30 and the lower shielding layer 19 are insulated from each other by the bias layers 70 and the lower insulating layer 23.

The bias layers 70 are composed of an antiferromagnetic insulating material, and an exchange coupling magnetic field (exchange anisotropic magnetic field) is developed at the interface between the bias layer 70 and the free magnetic layer 30. The magnetization direction of the free magnetic layer 30 is aligned in the X1 direction by the exchange coupling magnetic field. In this way, the bias layers 70 align the free magnetic layer 30 in a single-domain state, thus suppressing Barkhausen noise.

The bias layers 70 are preferably composed of an antiferromagnetic insulating material, such as NiO or ($\alpha$-$Fe_2O_3$, and are more preferably composed of NiO.

The thickness of the bias layer 70 is preferably set in the range of 20 to 100 nm, and in order to reliably align the magnetization direction of the free magnetic layer 30 in the X1 direction, the thickness is more preferably set in the range of 50 to 100 nm.

If the thickness of the bias layer 70 is less than 20 nm, the thickness of the insulating member in the spin-valve magnetic element 11 is decreased. In the polishing process of the surface facing a recording medium when a floating-type magnetic head is fabricated, if sagging occurs in a portion of the lower shielding layer 19, there is a high probability that the sag will reach the free magnetic layer 30 across the bias layers 70, thus causing short-circuiting, which is disadvantageous. The exchange coupling magnetic field for aligning the magnetization direction of the free magnetic layer 30 is also decreased, thus increasing Barkhausen noise, which is also disadvantageous. If the thickness of the bias layer 70 exceeds 100 nm, the gap width of the thin-film magnetic head 1 is increased, and thus narrowing of the gap is prevented, which is disadvantageous.

Additionally, the thickness of the bias layers 70 is determined by adjusting the height of the shielding protrusion 19a of the lower shielding layer 19 and the thickness of the lower insulating layer 23.

The antiferromagnetic layer 33 is composed of an antiferromagnetic material, is deposited on the pinned magnetic layer 32, and develops an exchange coupling magnetic field (exchange anisotropic magnetic field) at the interface between the pinned magnetic layer 32 and the antiferromagnetic layer 33, thus pinning the magnetization direction of the pinned magnetic layer 32 in the Y direction. Accordingly, the magnetization direction of the free magnetic layer 30 and the magnetization direction of the pinned magnetic layer 32 are orthogonal to each other.

The antiferromagnetic layer 33 is preferably composed of a PtMn alloy. The PtMn alloy has superior corrosion resistance in comparison with an NiMn alloy, an FeMn alloy, or the like, which has been conventionally used as an antiferromagnetic layer, and moreover, the PtMn alloy has a high blocking temperature and can produce a large exchange coupling magnetic field.

Instead of the PtMn alloy, an X-Mn alloy, where X is one element selected from the group consisting of Pd, Ru, Ir, Rh, and Os, or an X-Mn-X' alloy, where X is at least one element selected from the group consisting of Pt, Pd, Ru, Ir, Rh, and Os, and where X' is at least one element selected from the group consisting of Pd, Cr, Ni, Ne, Ar, Xe, and Kr, may be used.

In the PtMn alloy and the X-Mn alloy, preferably, the Pt or X content is in the range of 37 to 63 atomic %, and more preferably, in the range of 47 to 57 atomic %.

In the X-Mn-X' alloy, preferably, X+X' ranges from 37 to 63 atomic %, and more preferably, ranges from 47 to 57 atomic %. Furthermore, in the X-Mn-X' alloy, preferably, the X' content is in the range of 0.2 to 10 atomic %.

By using the alloy having the proper compositional range described above as the antiferromagnetic layer 33 and by performing annealing treatment, it is possible to obtain the antiferromagnetic layer 33 for producing a large exchange coupling magnetic field. In particular, in the case of the PtMn alloy, it is possible to obtain a superior antiferromagnetic layer 33 having an exchange coupling magnetic field of more than $6.4 \times 10^4$ A/m and a significantly high blocking temperature, at which the exchange coupling magnetic field is lost, of 380° C.

The pinned magnetic layer 32 is formed of a ferromagnetic thin film and is preferably composed of Co, an NiFe alloy, a CoNiFe alloy, a CoFe alloy, a CoNi alloy, or the like. Although the pinned magnetic layer 32 has a single-layer structure in FIG. 1, the pinned magnetic layer 32 may be divided into two layers by a nonmagnetic layer composed of a nonmagnetic material and the resulting two layers may be magnetically coupled to produce a ferrimagnetic state.

The nonmagnetic conductive layer 31 is preferably composed of a nonmagnetic material, such as Cu, Cr, Au, or Ag.

The free magnetic layer 30 is formed of a ferromagnetic thin film and is preferably composed of Co, an NiFe alloy, a CoNiFe alloy, a CoFe alloy, a CoNi alloy, or the like. Additionally, although the free magnetic layer 30 has a single-layer structure in FIG. 1, the free magnetic layer 30 may be divided into two layers by a nonmagnetic intermediate layer composed of a nonmagnetic material, and the resulting two layers may be magnetically coupled to produce a ferrimagnetic state.

Furthermore, a diffusion-inhibiting layer for inhibiting diffusion between the free magnetic layer 30 and the nonmagnetic conductive layer 31 may be provided on the free magnetic layer 30 in the portion in contact with the nonmagnetic conductive layer 31. A Co film is preferably used as the diffusion-inhibiting layer.

In a mechanism for producing a giant magnetoresistive effect in which nonmagnetic conductive layer 31 is sandwiched between the pinned magnetic layer 32 and the free magnetic layer 30, by forming the pinned magnetic layer 32 and the free magnetic layer 30 with the same material rather than with different materials, the possibility of causing phenomena other than spin-dependent scattering of conduction electrons is decreased, resulting in a higher magnetoresistive effect.

In the thin-film magnetic head 1, when the magnetization direction of the free magnetic layer 30 is changed due to a fringing magnetic field from a recording medium, such as a hard disk, the electrical resistance of the spin-valve thin-film magnetic element 11 is changed because of the relationship between the magnetization direction of the free magnetic layer and the magnetization direction of the pinned magnetic layer 32, which is pinned in the Y direction. The fringing magnetic field from the recording medium is detected due to a change in voltage based on the change in the electrical resistance.

Next, a method for fabricating the thin-film magnetic head 1 will be described with reference to FIGS. 4 to 10.

Figure 4:
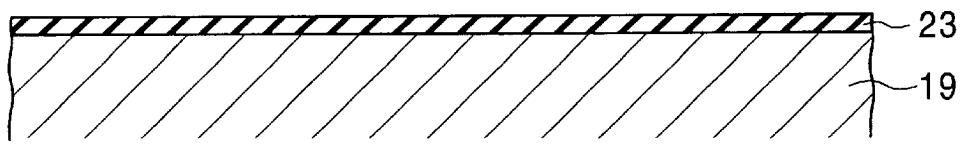
FIG. 4 is a schematic diagram illustrating a step in a method for fabricating the thin-film magnetic head shown in FIG. 1.

First, as shown in FIG. 4, the lower insulating layer 23 is deposited on the lower shielding layer 19.

Figure 5:
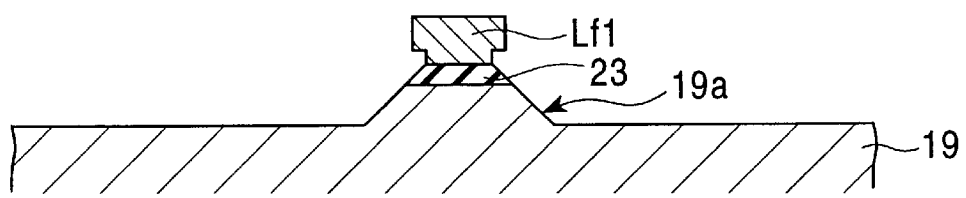
FIG. 5 is a schematic diagram illustrating a step in the method for fabricating the thin-film magnetic head shown in FIG. 1.

As shown in FIG. 5, a lift-off resist film Lf1 is then formed on the lower insulating layer 23 by post exposure baking (PEB) or the like, and both ends of the lift-off resist film Lf1 are etched by ion milling (physical ion beam etching) to form the shielding protrusion 19a.

Figure 6:
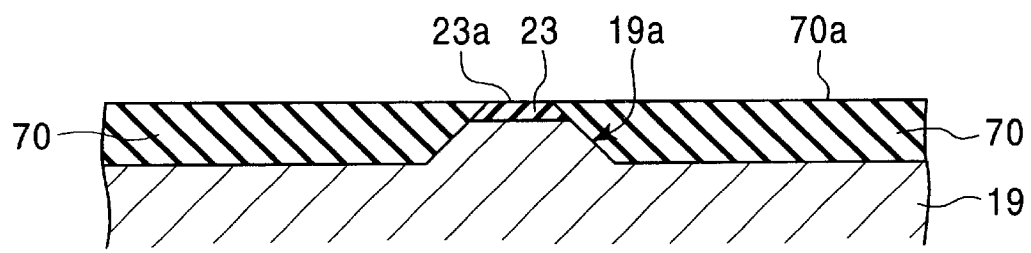
FIG. 6 is a schematic diagram illustrating a step in the method for fabricating the thin-film magnetic head shown in FIG. 1.

Next, as shown in FIG. 6, bias layers 70 are deposited on the lift-off resist film Lf1 and on both sides of the lift-off resist film Lf1 (both sides of the shielding protrusion 19a), and the lift-off resist film Lf1 is removed. In such a manner, the pair of bias layers 70 is formed. The bias layers 70 are deposited so that the upper surface 70a thereof is level with the upper surface 23a of the lower insulating layer 23.

Figure 7:
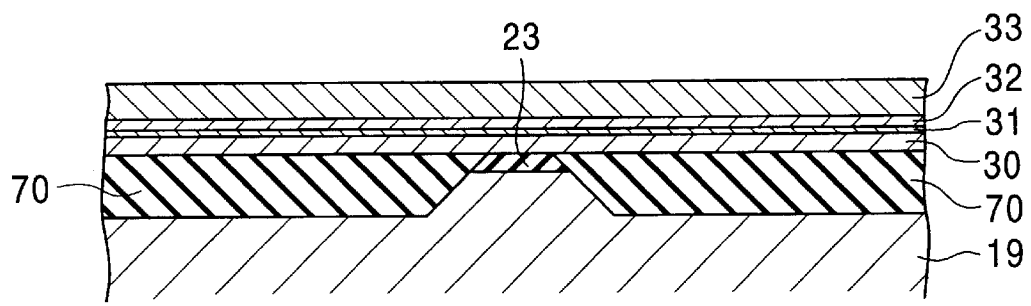
FIG. 7 is a schematic diagram illustrating a step in the method for fabricating the thin-film magnetic head shown in FIG. 1.

Next, as shown in FIG. 7, the free magnetic layer 30, the nonmagnetic conductive layer 31, the pinned magnetic layer 32, and the antiferromagnetic layer 33 are deposited in that order on the bias layers 70 and the lower insulating layer 23.

Additionally, before the free magnetic layer 30 is deposited, the upper surface 70a of the bias layer 70 must be etched by reverse sputtering or the like.

The reason for the above is that since the lift-off resist film Lf1 is formed outside a sputtering system or the like, the upper surface 70a is temporarily exposed to an atmospheric environment, and the upper surface 70a is contaminated with impurities in air, such as oxygen. Even if the free magnetic layer 30 is deposited on the contaminated upper surface 70a, an exchange coupling magnetic field is not developed at the interface therebetween, and thus it is necessary to etch the upper surface 70a of the bias layer 70 to remove the impurities before the free magnetic layer 30 is deposited.

Figure 8:
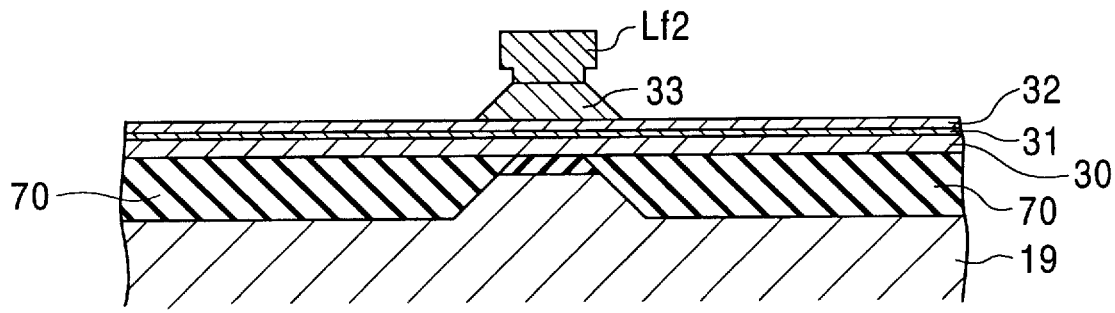
FIG. 8 is a schematic diagram illustrating a step in the method for fabricating the thin-film magnetic head shown in FIG. 1.

Next, as shown in FIG. 8, a lift-off resist film Lf2 is formed on the antiferromagnetic layer 33, and by etching both sides of the lift-off resist film Lf2 by ion milling (physical ion beam etching), the antiferromagnetic layer 33 on both sides of the lift-off resist film Lf2 is removed so that the antiferromagnetic layer 33 has a substantially trapezoidal cross section.

Figure 9:
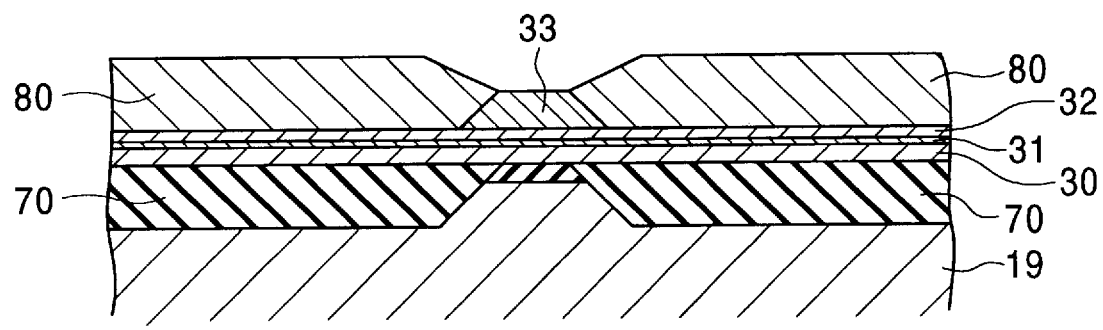
FIG. 9 is a schematic diagram illustrating a step in the method for fabricating the thin-film magnetic head shown in FIG. 1.

Next, as shown in FIG. 9, conductive layers 80 are deposited on both sides of the lift-off resist film Lf2 and the antiferromagnetic layer 33, and the lift-off resist film Lf2 is removed. In such a manner, the pair of conductive layers 80 is formed.

Figure 10:
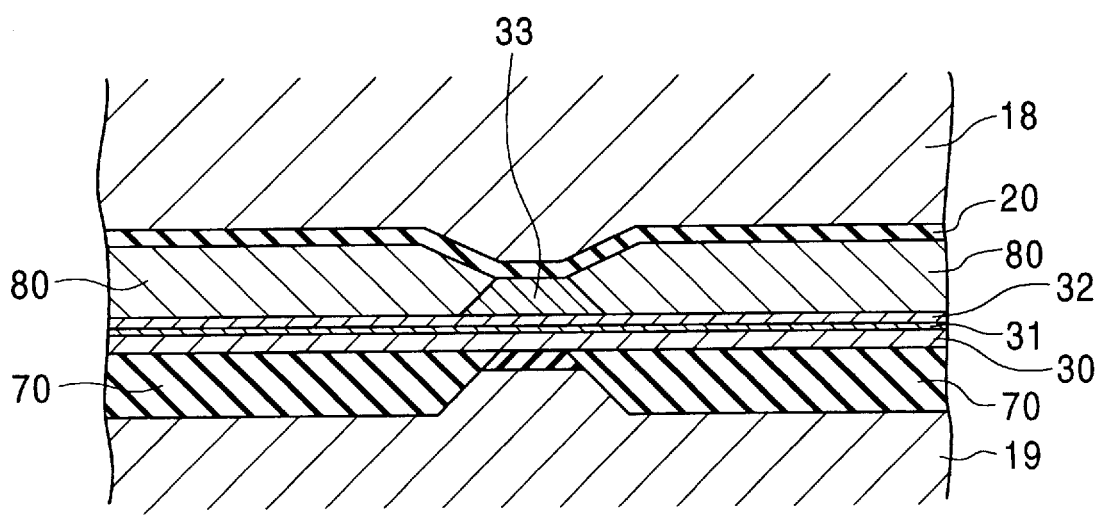
FIG. 10 is a schematic diagram illustrating a step in the method for fabricating the thin-film magnetic head shown in FIG. 1.

Lastly, as shown in FIG. 10, the upper insulating layer 20 and the upper shielding layer 18 are deposited. As described above, the thin-film magnetic head 1 is obtained.

In the thin-film magnetic head 1 described above, since the bias layers 70 are disposed on one side opposite to the Z direction of both sides in the thickness direction of the free magnetic layer 30, and the conductive layers 80 are disposed on the other side in the Z direction, when a sensing current is applied from the conductive layers 80 to the free magnetic layer 30, the sensing current does not flow in the bias layers 70 having a high resistivity, and thus heat generation of the spin-valve magnetic element 11 itself can be suppressed. The amount of the sensing current is not decreased.

Consequently, the disorder in the magnetization of the free magnetic layer 30 due to heating can be suppressed, Barkhausen noise in the free magnetic layer 30 can be decreased, and the reading output of the thin-film magnetic head 1 can be improved.

Since the pair of bias layers 70 is disposed on both sides in the track width direction of the shielding protrusion 19a of the lower shielding layer 19 and the lower insulating layer 23, it is possible to reduce the thickness of the thin-film magnetic head 1, thus being suitable for gap narrowing.

Since the lower shielding layer 19 is in contact with the insulating bias layers 70 and the lower insulating layer 23, it is possible to insulate the lower shielding layer 19 from the spin-valve thin-film magnetic element 11.

Since the pair of conductive layers 80 is disposed on both sides in the track width direction of the antiferromagnetic layer 33, it is possible to reduce the thickness of the thin-film magnetic head 1, thus enabling narrowing of the gap.

When the surface facing a recording medium is polished to determine the gap depth of the thin-film magnetic head 1, even if sagging occurs in a portion of the lower shielding layer 19 and the sag reaches the bias layers 70, since the bias layers 70 are composed of an antiferromagnetic insulating material, short-circuiting does not occur between the lower shielding layer 19 and the bias layers 70.

Next, a second embodiment of the present invention will be described with reference to the drawings.

Figure 11:
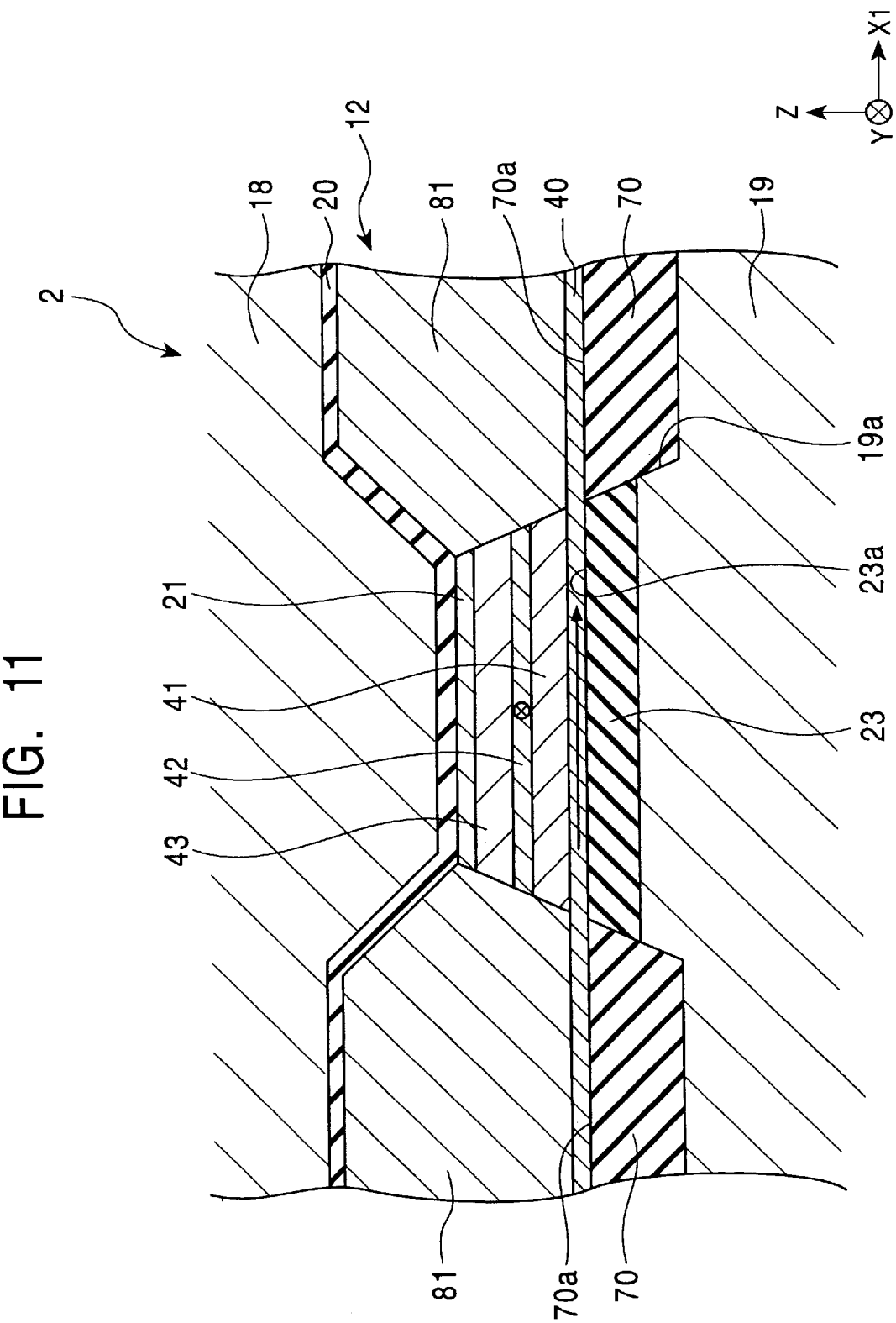
FIG. 11 is a sectional view which schematically shows a thin-film magnetic head, viewed from a surface facing a recording medium, in a second embodiment of the present invention.

FIG. 11 is a sectional view which schematically shows a thin-film magnetic head 2, viewed from the side of a magnetic recording medium, in the second embodiment of the present invention.

The thin-film magnetic head 2 shown in FIG. 11 includes a spin-valve thin-film magnetic element 12, and upper and lower insulating layers 20 and 23 and upper and lower shielding layers 18 and 19 deposited on both sides in the thickness direction of the spin-valve thin-film magnetic element 12, in a manner similar to that of the thin-film magnetic head 1 in the first embodiment.

The spin-valve thin-film magnetic element 12 is a top-type single spin-valve thin-film magnetic element, in which a free magnetic layer 40, a nonmagnetic conductive layer 41, a pinned magnetic layer 42, and an antiferromagnetic layer 43 are deposited in that order, in the same manner as that of the spin-valve thin-film magnetic element 11 in the first embodiment. The spin-valve thin-film magnetic element 12 is also provided with a pair of conductive layers 81 for applying a sensing current to the free magnetic layer 40, and a pair of bias layers 70 for aligning the magnetization of the free magnetic layer 40.

The thin-film magnetic head 2 differs from the thin-film magnetic head 1 in that the conductive layers 81 are disposed not only on both sides in the X1 direction (track width direction) of the antiferromagnetic layer 43, but also on both sides in the X1 direction of the nonmagnetic conductive layer 41 and the pinned magnetic layer 42; and that the conductive layers 81 are disposed on one side in the Z direction (the thickness direction) of the free magnetic layer 40 and are in contact with the free magnetic layer 40.

Additionally, since the lower shielding layer 19, a shielding protrusion 19a, the lower insulating layer 23, the bias layers 70, the upper insulating layer 20, and the upper shielding layer 18 shown in FIG. 11 have the same structures and are composed of the same materials as those of the lower shielding layer 19, the shielding protrusion 19a, the lower insulating layer 23, the bias layers 70, the upper insulating layer 20, and the upper shielding layer 18 described in the first embodiment, a description thereof will be omitted.

In the spin-valve thin-film magnetic element 12, the nonmagnetic conductive layer 41, the pinned magnetic layer 42, and the antiferromagnetic layer 43 are deposited in that order on one side (in the Z direction) in the thickness direction of the free magnetic layer 40. The nonmagnetic conductive layer 41, the pinned magnetic layer 42, and the antiferromagnetic layer 43 are formed so as to have a substantially trapezoidal cross section with a width corresponding to a track width.

The pair of conductive layers 81 for applying a sensing current to the free magnetic layer 40 are disposed on both sides in the X1 direction of the nonmagnetic conductive layer 41, the pinned magnetic layer 42, and the antiferromagnetic layer 43. The conductive layers 81 are disposed on both sides and on the upper side in the thickness direction of the free magnetic layer 40, and are in contact with the free magnetic layer 40.

Additionally, the conductive layers 81 are preferably composed of Cr, Ta, Au, Cu, or the like.

A cap layer 21 composed of Ta or the like is formed on the antiferromagnetic layer 43, and the upper insulating layer 20 is further deposited over the conductive layers 81 and the cap layer 21.

The upper shielding layer 18 is deposited on the upper insulating layer 20.

The magnetization direction of the free magnetic layer 40 is aligned in the X1 direction by the bias layers 70, and the magnetization of the pinned magnetic layer 42 is pinned in the Y direction due to an exchange coupling magnetic field between the pinned magnetic layer 42 and the antiferromagnetic layer 43.

The lower shielding layer 19 is in contact with the bias layers 70 and the lower insulating layer 23. Consequently, the free magnetic layer 40 and the lower shielding layer 19 are insulated from each other by the bias layers 70 and the lower insulating layer 23.

Additionally, the free magnetic layer 40, the nonmagnetic conductive layer 41, the pinned magnetic layer 42, and the antiferromagnetic layer 43 are composed of the same materials as those for the free magnetic layer 30, the nonmagnetic conductive layer 31, the pinned magnetic layer 32, and the antiferromagnetic layer 33 described in the first embodiment.

The thin-film magnetic head 2 is fabricated in a manner similar to that for the thin-film magnetic head 1 in the first embodiment, apart from the fact that the free magnetic layer 40, the nonmagnetic conductive layer 41, the pinned magnetic layer 42, and the antiferromagnetic layer 43 are deposited in that order, a lift-off resist film is formed on the antiferromagnetic layer 43, the free magnetic layer 40 is exposed by etching the nonmagnetic conductive layer 41, the pinned magnetic layer 42, and the antiferromagnetic layer 43 on both sides of the lift-off resist film, and the conductive layers 81 are deposited on the free magnetic layer 40.

The thin-film magnetic head 2 exhibits substantially the same effects as those of the thin-film magnetic head 1 in the first embodiment, and the effect described below is also obtained.

That is, in the thin-film magnetic head 2, since the conductive layers 81 are disposed on both sides in the track width direction of the nonmagnetic conductive layer 41, the pinned magnetic layer 42, and the antiferromagnetic layer 43, and are in contact with the free magnetic layer 40, it is possible to efficiently apply a sensing current to the free magnetic layer 40, thus increasing the reading output of the thin-film magnetic head 2.

Next, a third embodiment of the present invention will be described with reference to the drawings.

Figure 12:
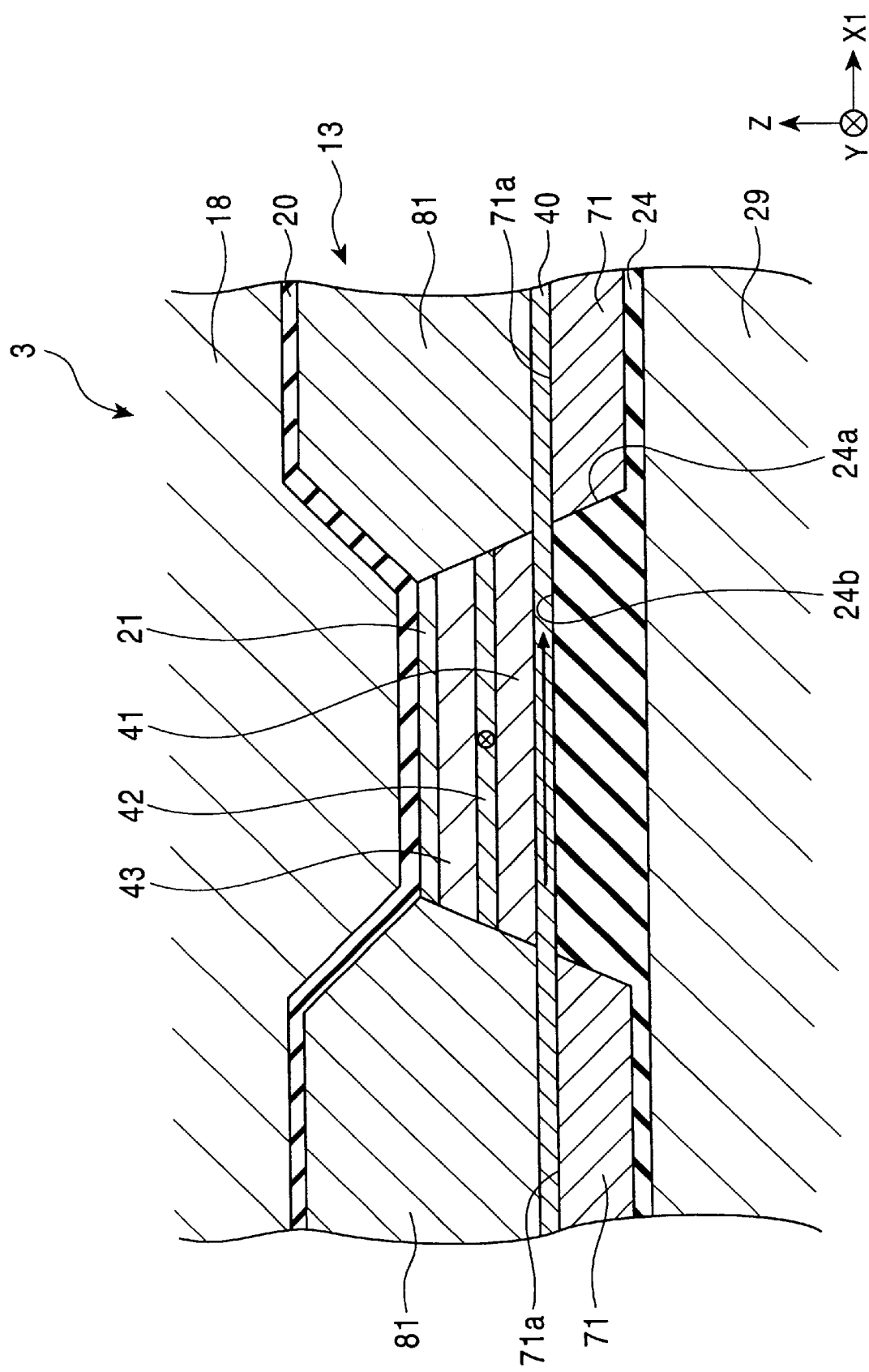
FIG. 12 is a sectional view which schematically shows a thin-film magnetic head, viewed from a surface facing a recording medium, in a third embodiment of the present invention.

FIG. 12 is a sectional view which schematically shows a thin-film magnetic head 3, viewed from the side of a magnetic recording medium, in a third embodiment of the present invention.

The thin-film magnetic head 3 shown in FIG. 12 includes a spin-valve thin-film magnetic element 13, and upper and lower insulating layers 20 and 24 and upper and lower shielding layers 18 and 29 deposited on both sides in the thickness direction of the spin-valve thin-film magnetic element 13, in a manner similar to that of the thin-film magnetic head 1 or 2 in the first or second embodiment.

The spin-valve thin-film magnetic element 13 is a top-type single spin-valve thin-film magnetic element, in which a free magnetic layer 40, a nonmagnetic conductive layer 41, a pinned magnetic layer 42, and an antiferromagnetic layer 43 are deposited in that order, in the same manner as that of the spin-valve thin-film magnetic element 11 or 12 in the first or second embodiment. The spin-valve thin-film magnetic element 13 is also provided with conductive layers 81 for applying a sensing current to the free magnetic layer 40, and a pair of bias layers 71 for aligning the magnetization of the free magnetic layer 40.

The thin-film magnetic head 3 differs from the thin-film magnetic heads 1 and 2 in the first and second embodiments in that the lower insulating layer 24 is deposited on the entire surface of the lower shielding layer 29, and an insulating protrusion 24a protruding toward the spin-valve thin-film magnetic element 13 is provided on the lower insulating layer 24, and the pair of bias layers 71 is disposed on both sides in the track width direction of the insulating protrusion 24a.

Additionally, since the free magnetic layer 40, the nonmagnetic conductive layer 41, the pinned magnetic layer 42, and antiferromagnetic layer 43, a cap layer 21, the conductive layers 81, the upper insulating layer 20, and the upper shielding layer 18 have the same structures and are composed of the same materials as those of the free magnetic layer 40, the nonmagnetic conductive layer 41, the pinned magnetic layer 42, the antiferromagnetic layer 43, the cap layer 21, the conductive layers 81, the upper insulating layer 20, and the upper shielding layer 18 described in the second embodiment, a description thereof will be omitted.

In FIG. 12, the lower insulating layer 24 is deposited on the lower shielding layer 29. The lower insulating layer 24 is provided with the insulating protrusion 24a protruding toward the spin-valve thin-film magnetic element 13. The width in the X1 direction of the insulating protrusion 24a corresponds to the track width of the thin-film magnetic head 3. The free magnetic layer 40 is in contact with an upper surface 24b of the insulating protrusion 24a.

A pair of bias layers 71 are disposed on a side opposite to the Z direction of the free magnetic layer 40 and on both sides in the X1 direction (both sides in the track width direction) of the insulating protrusion 24a of the lower insulating layer 24.

The bias layers 71 are deposited so that an upper surface 71a thereof is level with the upper surface 24b of the insulating protrusion 24a, and are in contact with the free magnetic layer 40.

As described above, the entirety of the pair of bias layers 71 is disposed on both sides in the X1 direction of the insulating protrusion 24a of the lower insulating layer 24, and is embedded in the lower insulating layer 24.

The bias layers 71 are composed of an antiferromagnetic insulating material or an antiferromagnetic conductive material, and an exchange coupling magnetic field (exchange anisotropic magnetic field) is produced at the interface between the bias layer 71 and the free magnetic layer 40, and the magnetization direction of the free magnetic layer 40 is aligned in the X1 direction. That is, the bias layers 71 align the free magnetic layer 40 in a single-domain state, thus suppressing Barkhausen noise.

In the thin-film magnetic head 3, since the bias layers 71 are embedded on both sides in the track width direction of the insulating protrusion 24a of he lower insulating layer 24 and are insulated from the lower shielding layer 29 by the lower insulating layer 24, it is possible to form the bias layers 71 using an antiferromagnetic conductive material as well as an antiferromagnetic insulating material.

In particular, when the bias layers 71 are composed of the antiferromagnetic conductive material, since a relatively large exchange coupling magnetic field is produced at the interface with the free magnetic layer 40, it is possible to reduce the thickness of the bias layers 71 to 5 to 30 nm, which is relatively thin, thus enabling narrowing of the gap in the thin-film magnetic head 3.

When the bias layers 71 are composed of the antiferromagnetic insulating material, the thickness of the bias layers 71 is preferably set at 20 to 100 nm, and in order to reliably align the magnetization direction of the free magnetic layer 40 in the X1 direction, the thickness of the bias layers 71 is preferably set at 50 to 100 nm.

If the thickness of the bias layers 71 is less than 20 nm, since the exchange coupling magnetic field for aligning the magnetization direction of the free magnetic layer 40 is decreased, Barkhausen noise increases, which is disadvantageous. If the thickness of the bias layers 71 exceeds 100 nm, since the gap width of the thin-film magnetic head 3 is increased, it is not possible to narrow the gap, which is disadvantageous.

When the bias layers 71 are composed of the antiferromagnetic conductive material, the thickness of the bias layers 71 is preferably set at 5 to 30 nm, and in order to reliably align the magnetization direction of the free magnetic layer 40 in the X1 direction, the thickness of the bias layers 71 is preferably set at 10 nm to 30 nm.

If the thickness of the bias layers 71 is less than 5 nm, since the exchange coupling magnetic field for aligning the magnetization direction of the free magnetic layer 40 is decreased, Barkhausen noise increases, which is disadvantageous.

If the thickness of the bias layers 71 exceeds 30 nm, since the exchange coupling magnetic field produced at the interface with the free magnetic layer 40 becomes too large, the magnetization direction of the free magnetic layer 40 is pinned and the magnetization direction of the free magnetic layer 40 cannot be changed by an external magnetic field, and thus it is not possible to detect the external magnetic field, which is disadvantageous.

Additionally, the thickness of the bias layers 71 is determined by adjusting the height of the insulating protrusion 24a of the lower insulating layer 24.

Examples of the antiferromagnetic insulating material constituting the bias layers 71 are NiO and $\alpha\text{-Fe}_2O_3$, and in particular, NiO is preferably used.

Preferably, the antiferromagnetic conductive material constituting the bias layers 71 is one of an X-Mn alloy, where X is at least one element selected from the group consisting of Pt, Pd, Ru, Ir, Rh, and Os, and an X-Mn-X' alloy, where X is at least one element selected from the group consisting of Pt, Pd, Ru, Ir, Rh, and Os and where X' is at least one element selected from the group consisting of Pd, Cr, Ni, Ne, Ar, Xe, and Kr.

Additionally, in the X-Mn alloy, preferably, the X content is in the range of 37 to 63 atomic %, and more preferably, in the range of 47 to 57 atomic %.

In the X-Mn-X' alloy, preferably, X+X' ranges from 37 to 63 atomic %, and more preferably, ranges from 47 to 57 atomic %. Furthermore, in the X-Mn-X' alloy, preferably, the X' content is in the range of 0.2 to 10 atomic %.

The thin-film magnetic head 3 is fabricated in a manner similar to that for the thin-film magnetic head 2 in the second embodiment, apart from the fact that the lower shielding layer 29 and the lower insulating layer 24 are deposited, a lift-off resist film is formed on the lower insulating layer 24, the insulating layer 24 on both sides of the lift-off film is etched to form the insulating protrusion 24a, and the bias layers 71 are formed on both sides of the insulating protrusion 24a.

The thin-film magnetic head 3 exhibits substantially the same effects as those of the thin-film magnetic heads 1 and 2 described in the first and second embodiments, and the effects described below are also obtained.

That is, in the thin-film magnetic head 3, since the bias layers 71 are embedded in the lower insulating layer 24, it is possible to further narrow the gap of the thin-film magnetic head 3.

Since the bias layers 71 are insulated from the lower shielding layer 29 by the lower insulating layer 24, the bias layers 71 can be composed of an antiferromagnetic conductive material as well as an antiferromagnetic insulating material. In particular, when the bias layers 71 are composed of the antiferromagnetic conductive material, since the exchange coupling magnetic field produced at the interface with the free magnetic layer 40 becomes relatively large, it is possible to reduce the thickness of the bias layers 71, and thus the gap of the thin-film magnetic head 3 can be further narrowed.

Next, a fourth embodiment of the present invention will be described with reference to the drawings.

Figure 13:
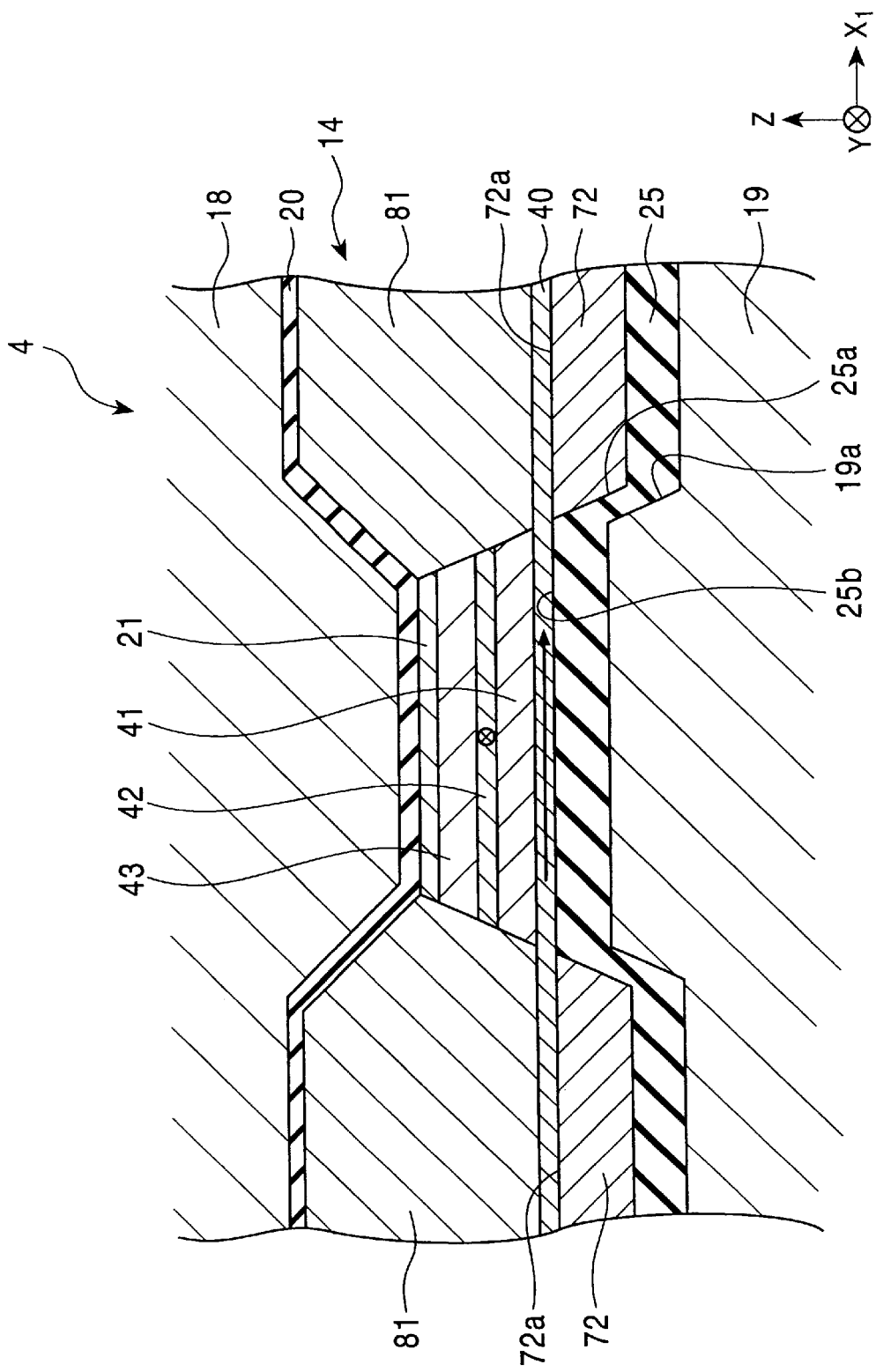
FIG. 13 is a sectional view which schematically shows a thin-film magnetic head, viewed from a surface facing a recording medium, in a fourth embodiment of the present invention.

FIG. 13 is a sectional view which schematically shows a thin-film magnetic head 4, viewed from the side of a magnetic recording medium, in a fourth embodiment of the present invention.

The thin-film magnetic head 4 shown in FIG. 13 includes a spin-valve thin-film magnetic element 14, and upper and lower insulating layers 20 and 25 and upper and lower shielding layers 18 and 19 deposited on both sides in the thickness direction of the spin-valve thin-film magnetic element 14.

The spin-valve thin-film magnetic element 14 is a top-type single spin-valve thin-film magnetic element, in which a free magnetic layer 40, a nonmagnetic conductive layer 41, a pinned magnetic layer 42, and an antiferromagnetic layer 43 are deposited in that order, in the same manner as that of the spin-valve thin-film magnetic element 11 or 12 in the first or second embodiment. The spin-valve thin-film magnetic element 14 is also provided with conductive layers 81 for applying a sensing current to the free magnetic layer 40, and a pair of bias layers 72 for aligning the magnetization of the free magnetic layer 40.

The thin-film magnetic head 4 differs from the thin-film magnetic heads 1 and 2 in the first and second embodiments in that the lower shielding layer 19 is provided with a shielding protrusion 19a protruding toward the spin-valve thin-film magnetic element 14, the lower insulating layer 25 is deposited on the shielding protrusion 19a and over the entire surface of the lower shielding layer 19, and the pair of bias layers 72 is disposed on both sides in the track width direction of the shielding protrusion 19a. Therefore, the lower insulating layer 25 is interposed between the lower shielding layer 19 and the spin-valve thin-film magnetic element 14.

Additionally, since the free magnetic layer 40, the nonmagnetic conductive layer 41, the pinned magnetic layer 42, the antiferromagnetic layer 43, a cap layer 21, the conductive layers 81, the upper insulating layer 20, and the upper shielding layer 18 have the same structures and are composed of the same materials as those of the free magnetic layer 40, the nonmagnetic conductive layer 41, the pinned magnetic layer 42, the antiferromagnetic layer 43, the cap layer 21, the conductive layers 81, the upper insulating layer 20, and the upper shielding layer 18 described in the second embodiment, a description thereof will be omitted.

As shown in FIG. 13, the lower shielding layer 19 is provided with the shielding protrusion 19a protruding toward the spin-valve thin-film magnetic element 14. The width in the X1 direction of the shielding protrusion 19a corresponds to the track width of the thin-film magnetic head 4. The lower insulating layer 25 is deposited on the lower shielding layer 19. The lower insulating layer 25 is deposited on the shielding protrusion 19a of the lower shielding layer 19 and over the entire surface of the lower shielding layer 19. The lower insulating layer 25 is provided with an insulating protrusion 25a corresponding to the shielding protrusion 19a of the lower shielding layer 19. The width in the X1 direction of the insulating protrusion 25a also corresponds to the track width of the thin-film magnetic head 4, the same as the shielding protrusion 19a.

The pair of bias layers 72 is disposed on a side opposite to the Z direction in the thickness direction of the free magnetic layer 40 and on both sides in the X1 direction (both sides in the track width direction) of the shielding protrusion 19a of the shielding layer 19 and the insulating protrusion 25a of the lower insulating layer 25.

The bias layers 72 are deposited so that an upper surface 72a thereof is level with an upper surface 25b of the insulating protrusion 25a of the lower insulating layer 25, and are in contact with the free magnetic layer 40.

As described above, the entirety of the pair of bias layers 72 is disposed on both sides in the X1 direction of the shielding protrusion 19a of the lower shielding layer 19 and the insulating protrusion 25a of the lower insulating layer 25, i.e., the pair of bias layers 72 is embedded in the lower shielding layer 19 and the lower insulating layer 25.

The bias layers 72 are composed of an antiferromagnetic insulating material or an antiferromagnetic conductive material, an exchange coupling magnetic field (exchange anisotropic magnetic field) is produced at the interface between the bias layers 72 and the free magnetic layer 40, and the magnetization direction of the free magnetic layer 40 is aligned in the X1 direction by the exchange coupling magnetic field. As described above, the bias layers 72 align the free magnetic layer 40 in a single-domain state, thus suppressing Barkhausen noise.

The specific examples of the antiferromagnetic insulating material and the antiferromagnetic conductive material constituting the bias layers 72 are the same as those for the bias layers 71 described in the third embodiment.

Additionally, the thickness of the bias layers 72 is determined by adjusting the height of the shielding protrusion 19a of the lower shielding layer 19 and the thickness of the lower insulating layer 25.

The thin-film magnetic head 4 is fabricated in a manner similar to that for the thin-film magnetic head 2 in the second embodiment, apart from the fact that the lower shielding layer 19 is deposited, a lift-off resist film is formed on the lower shielding layer 19, the lower shielding layer 19 on both sides of the lift-off resist film is etched to form the shielding protrusion 19a, the lower insulating layer 25 is formed on the lower shielding layer 19, and bias layers 72 are formed on both sides of the shielding protrusion 19a of the lower shielding layer 19.

The thin-film magnetic head 4 exhibits substantially the same effects as those of the thin-film magnetic heads 1 and 2 described in the first and second embodiments, and the effects described below are also obtained.

In the thin-film magnetic head 4, since the bias layers 72 are embedded on both sides of the insulating protrusion 25a of the lower insulating layer 25 and the shielding protrusion 19a of the lower shielding layer 19, the gap of the thin-film magnetic head 4 can be further narrowed.

Since the bias layers 72 are insulated from the lower shielding layer 19 by the lower insulating layer 25, the bias layers 72 can be composed of an antiferromagnetic conductive material as well as an antiferromagnetic insulating material. In particular, when the bias layers 72 are composed of the antiferromagnetic conductive material, since the exchange coupling magnetic field produced at the interface with the free magnetic layer 40 becomes relatively large, it is possible to reduce the thickness of the bias layers 72, and thus the gap of the thin-film magnetic head 4 can be further narrowed.

Next, a fifth embodiment of the present invention will be described with reference to the drawings.

Figure 14:
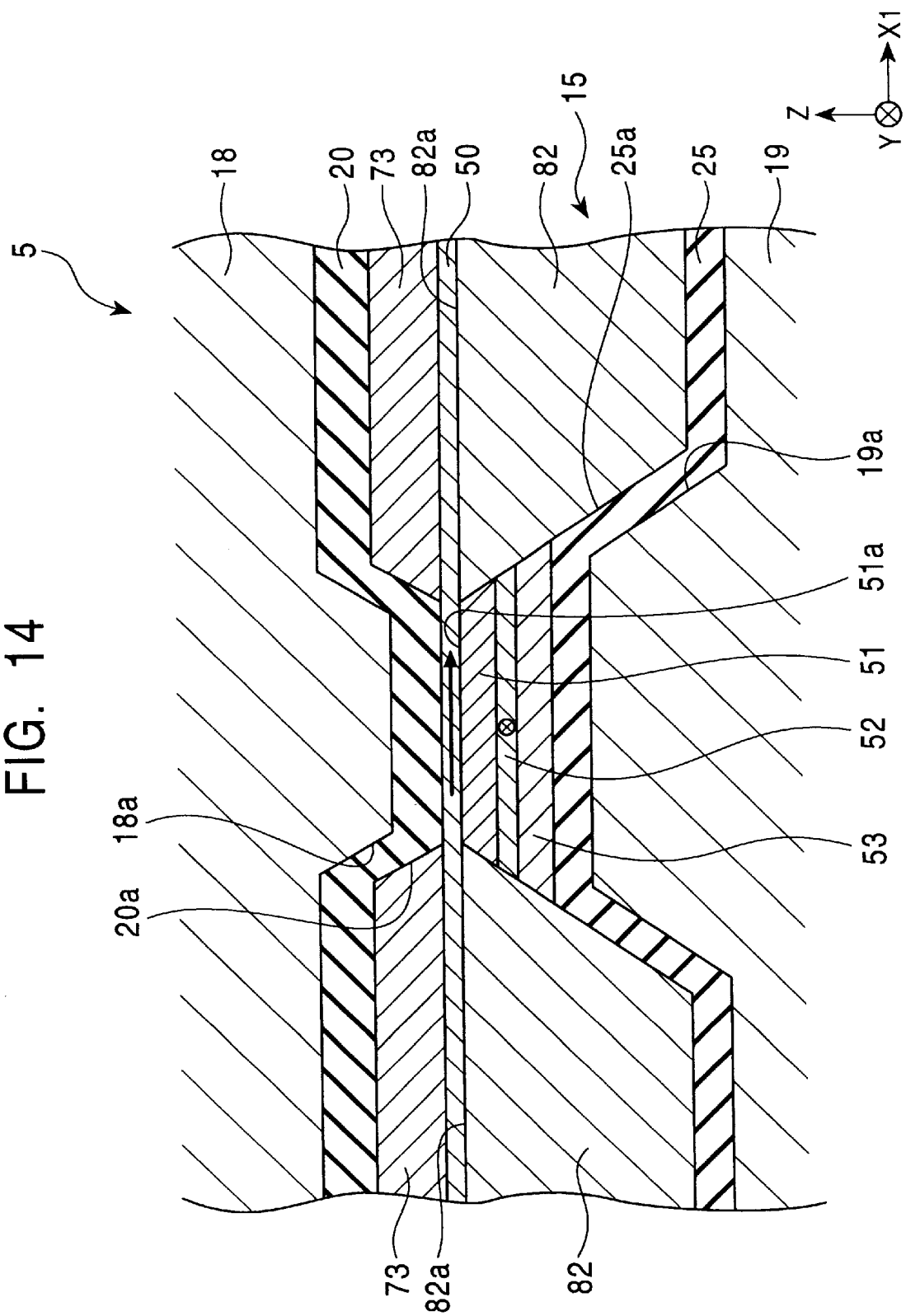
FIG. 14 is a sectional view which schematically shows a thin-film magnetic head, viewed from a surface facing a recording medium, in a fifth embodiment of the present invention.

FIG. 14 is a sectional view which schematically shows a thin-film magnetic head 5, viewed from the side of a magnetic recording medium, in a fifth embodiment of the present invention.

The thin-film magnetic head 5 shown in FIG. 14 includes a spin-valve thin-film magnetic element 15, and upper and lower insulating layers 20 and 25 and upper and lower shielding layers 18 and 19 deposited on both sides in the thickness direction of the spin-valve thin-film magnetic element 15.

As shown in FIG. 14, the lower shielding layer 19 is provided with a shielding protrusion 19a protruding toward the spin-valve thin-film magnetic element 15.

The lower insulating layer 25 is deposited on the lower shielding layer 19, and the lower insulating layer 25 is provided with an insulating protrusion 25a corresponding to the shielding protrusion 19a of the lower shielding layer 19.

The upper shielding layer 18 is provided with another shielding protrusion 18a protruding toward the spin-valve thin-film magnetic element 15.

The upper insulating layer 20 is interposed between the upper shielding layer 18 and the spin-valve thin-film magnetic element 15, and the upper insulating layer 20 is provided with an insulating protrusion 20a corresponding to the shielding protrusion 18a of the upper shielding layer 18.

The spin-valve thin-film magnetic element 15 is a bottom-type single spin-valve thin-film magnetic element, in which an antiferromagnetic layer, a pinned magnetic layer, a non-magnetic conductive layer, and a free magnetic layer are deposited in that order. The spin-valve thin-film magnetic element 15 is also provided with conductive layers for applying a sensing current to the free magnetic layer, and a pair of bias layers for aligning the magnetization of the free magnetic layer.

In the spin-valve thin-film magnetic element 15, a nonmagnetic conductive layer 51, a pinned magnetic layer 52, and an antiferromagnetic layer 53 are deposited in that order on a side opposite to the Z direction of a free magnetic layer 50. The nonmagnetic conductive layer 51, the pinned magnetic layer 52, and the antiferromagnetic layer 53 are formed so as to have a substantially trapezoidal cross section, which is in contact with the insulating protrusion 25a of the lower insulating layer 25, with a width corresponding to the track width.

A pair of conductive layers 82 for applying a sensing current to the free magnetic layer 50 is disposed on one side opposite to the Z direction in the thickness direction of the free magnetic layer 50 and on both sides in the X1 direction of the shielding protrusion 19a of the lower shielding layer 19, the insulating protrusion 25a of the lower insulating layer 25, the antiferromagnetic layer 53, the pinned magnetic layer 52, and the nonmagnetic conductive layer 51.

The conductive layers 82 are deposited so that an upper surface 82a thereof is level with an upper surface 51a of the nonmagnetic conductive layer 51, and the nonmagnetic conductive layer 51 and the conductive layers 82 are in contact with the free magnetic layer 50.

Additionally, the conductive layers 82 are preferably composed of Cr, Ta, Au, Cu, or the like.

A pair of bias layers 73 is formed on the other side in the thickness direction of the free magnetic layer 50, in the Z direction, and on both sides in the track width direction (on both sides in the X1 direction) of the shielding protrusion 18a of the upper shielding layer 18 and the insulating protrusion 20a of the insulating layer 20, and is in contact with the free magnetic layer 50.

As described above, the entirety of the pair of bias layers 73 is disposed on both sides in the X1 direction of the insulating protrusion 20a of the upper insulating layer 20 and the shielding protrusion 18a of the upper shielding layer 18, i.e., the bias layers 73 are embedded in the upper insulating layer 20 and the upper shielding layer 18.

The upper shielding layer 18 and the spin-valve thin-film magnetic element 15 are insulated from each other by the upper insulating layer 20.

The bias layers 73 are composed of an antiferromagnetic insulating material or an antiferromagnetic conductive material, an exchange coupling magnetic field (exchange anisotropic magnetic field) is produced at the interface between the bias layers 73 and the free magnetic layer 50, and the magnetization direction of the free magnetic layer 50 is aligned in the X1 direction by the exchange coupling magnetic field. As described above, the bias layers 73 align the free magnetic layer 50 in a single-domain state, thus suppressing Barkhausen noise.

The specific examples of the antiferromagnetic insulating material and the antiferromagnetic conductive material constituting the bias layers 73 are the same as those for the bias layers 71 described in the third embodiment, and the thickness of the bias layers 73 are also the same as that of the bias layers 71.

Additionally, the thickness of the bias layers 73 is determined by adjusting the height of the shielding protrusion 18a of the upper shielding layer 18 and the thickness of the upper insulating layer 20.

The antiferromagnetic layer 53 is preferably composed of a PtMn alloy. The PtMn alloy has superior corrosion resistance in comparison with an NiMn alloy, an FeMn alloy, or the like, which has been used as an antiferromagnetic layer, and moreover, the PtMn alloy has a high blocking temperature and can produce a large exchange coupling magnetic field.

Instead of the PtMn alloy, an X-Mn alloy, where X is one element selected from the group consisting of Pd, Ru, Ir, Rh, and Os, or an X-Mn-X' alloy, where X is at least one element selected from the group consisting of Pt, Pd, Ru, Ir, Rh, and Os and where X' is at least one element selected from the group consisting of Pd, Cr, Ni, Ne, Ar, Xe, and Kr.

In the PtMn alloy and the X-Mn alloy, preferably, the Pt or X content is in the range of 37 to 63 atomic %, and more preferably, in the range of 47 to 57 atomic %.

In the X-Mn-X' alloy, preferably, X+X' ranges from 37 to 63 atomic %, and more preferably, ranges from 44 to 57 atomic %. Furthermore, in the X-Mn-X' alloy, preferably, the X' content is in the range of 0.2 to 10 atomic %.

By using the alloy having the proper compositional range described above as the antiferromagnetic layer 53 and by performing annealing treatment, it is possible to obtain the antiferromagnetic layer 53 for producing a large exchange coupling magnetic field. In particular, in the case of the PtMn alloy, it is possible to obtain a superior antiferromagnetic layer 33 having an exchange coupling magnetic field of more than $6.4 \times 10^4$ A/m and a significantly high blocking temperature, at which the exchange coupling magnetic field is lost, of 380° C.

Additionally, the free magnetic layer 50, the nonmagnetic layer 51, and the pinned magnetic layer 52 are composed of the same materials as those for the free magnetic layer 30, the nonmagnetic conductive layer 31, and the pinned magnetic layer 32 described in the first embodiment.

The thin-film magnetic head 5 exhibits substantially the same effects as those of the thin-film magnetic head 4 in the fourth embodiment.

Next, a sixth embodiment of the present invention will be described with reference to the drawings.

Figure 15:
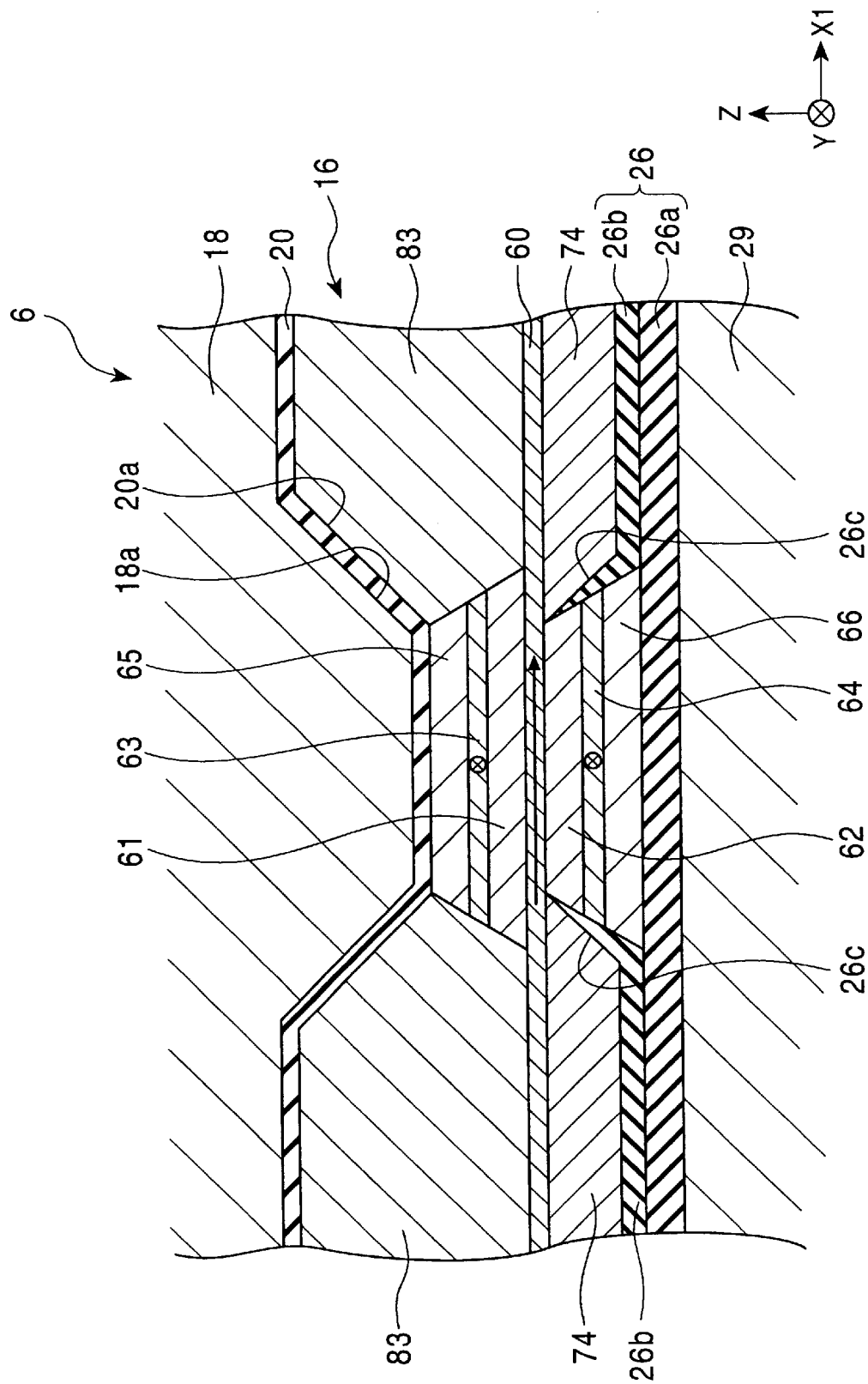
FIG. 15 is a sectional view which schematically shows a thin-film magnetic head, viewed from a surface facing a recording medium, in a sixth embodiment of the present invention.

FIG. 15 is a sectional view which schematically shows a thin-film magnetic head 6, viewed from the side of a magnetic recording medium, in a sixth embodiment of the present invention.

The thin-film magnetic head 6 shown in FIG. 15 includes a spin-valve thin-film magnetic element 16, and upper and lower insulating layers 20 and 26 and upper and lower shielding layers 18 and 29 deposited on both sides in the thickness direction of the spin-valve thin-film magnetic element 16, in a manner similar to that for the thin-film magnetic head 1 or 2 in the first or second embodiment.

Additionally, since the upper insulating layer 20 and the upper shielding layer 18 have the same structures and are composed of the same materials as those of the upper insulating layer 20 and the upper shielding layer 18 described in the first embodiment, a description thereof will be omitted.

As shown in FIG. 15, the lower insulating layer 26 is deposited on the lower shielding layer 29 composed of a magnetic alloy.

The lower insulating layer 26 includes a lower insulating bottom layer 26a composed of alumina or the like formed over the entire surface of the lower shielding layer 29 and a pair of lower insulating top layers 26b composed of alumina or the like deposited on the lower insulating bottom layer 26a. A lower antiferromagnetic layer 66 is disposed between the pair of lower insulating top layers 26b.

The spin-valve thin-film magnetic element 16 is a dual spin-valve thin-film magnetic element, in which a nonmagnetic conductive layer, a pinned magnetic layer, and an antiferromagnetic layer are deposited in that order on each side in the thickness direction of a free magnetic layer. The spin-valve thin-film magnetic element 16 is also provided with conductive layers for applying a sensing current to the free magnetic layer, and a pair of bias layers for aligning the magnetization of the free magnetic layer.

A shown in FIG. 15, an upper nonmagnetic conductive layer 61, an upper pinned magnetic layer 63, and an upper antiferromagnetic layer 65 are deposited on one side in the thickness direction of a free magnetic layer 60 (on a side in the Z direction). A lower nonmagnetic conductive layer 62, a lower pinned magnetic layer 64, and a lower antiferromagnetic layer 66 are deposited on the other side in the thickness direction of the free magnetic layer 60 (on a side opposite to the Z direction).

The upper antiferromagnetic layer 65 is in contact with the upper insulating layer 20, and the lower antiferromagnetic layer 66 is in contact with the lower insulating bottom layer 26a.

Each of the upper and lower nonmagnetic conductive layers 61 and 62, upper and lower pinned magnetic layers 63 and 64, and upper and lower antiferromagnetic layers 65 and 66 has a substantially trapezoidal cross section with a width corresponding to the track width.

Additionally, the free magnetic layer 60, the upper and lower nonmagnetic conductive layers 61 and 62, the upper and lower pinned magnetic layers 63 and 64, and the lower antiferromagnetic layer 66 are composed of the same materials as those for the free magnetic layer 30, the nonmagnetic conductive layer 31, the pinned magnetic layer 32, and the antiferromagnetic layer 33 described in the first embodiment, respectively.

The upper antiferromagnetic layer 65 is composed of the same material as that for the antiferromagnetic layer 43 described in the third embodiment.

The lower insulating top layers 26b are deposited on the lower insulating bottom layer 26a and portions of the lower insulating top layers 26b extend over both sides in the X1 direction (track width direction) of the lower nonmagnetic conductive layer 62, the lower pinned magnetic layer 64, and the lower antiferromagnetic layer 66.

A pair of bias layers 74 is disposed on both sides in the X1 direction of the lower nonmagnetic conductive layer 62, the lower pinned magnetic layer 64, and the lower antiferromagnetic layer 66.

The bias layers 74 are adjacent to the lower nonmagnetic conductive layer 62, the lower pinned magnetic layer 64, and the lower antiferromagnetic layer 66 with the portions of the lower insulating top layers 26b extending over both sides of the lower antiferromagnetic layer 66, etc., therebetween. That is, the pair of bias layers 74 are disposed on both sides in the X1 direction of the portions of the lower insulating top layers 26b and embedded in the lower insulating layer 26. In this way, the bias layers 74 are insulated from the lower shielding layer 29 by the lower insulating layer 26.

The bias layers 74 are located on a side opposite to the Z direction in the thickness direction of the free magnetic layer 60 and are in contact with the free magnetic layer 60.

The bias layers 74 are composed of an antiferromagnetic insulating material or an antiferromagnetic conductive material, and develops an exchange coupling magnetic field (exchange anisotropic magnetic field) at the interfaces between the free magnetic layer 60 and the bias layers 74. The magnetization direction of the free magnetic layer 60 is aligned by the exchange coupling magnetic field. Thus, the bias layers 74 align the free magnetic layer 60 in a single-domain state, thus suppressing Barkhausen noise.

The specific examples of the antiferromagnetic insulating material and the antiferromagnetic conductive material and the thickness of the bias layers 74 are the same as those of the bias layers 71 described in the third embodiment.

A pair of conductive layers 83, which applies a sensing current to the free magnetic layer 60, is disposed on both sides in the X1 direction of the upper nonmagnetic conductive layer 61, the upper pinned magnetic layer 62, and the upper antiferromagnetic layer 63. The conductive layers 83 are located on one side (in the Z direction) in the thickness direction of the free magnetic layer 60 and are in contact with the free magnetic layer 60.

Additionally, the conductive layers 83 are preferably composed of Cr, Ta, Au, Cu, or the like.

In the thin-film magnetic head 6, since the bias layers 74 are disposed on one side (opposite to the Z direction) in the thickness direction of the free magnetic layer 60 and the conductive layers 83 are disposed on the other side (in the Z direction) of the free magnetic layer 60, when a sensing current is applied from the conductive layers 83 to the free magnetic layer 60, the sensing current does not flow in the bias layers 74 having a high resistivity, and thus heat generation of the spin-valve magnetic element 16 itself can be suppressed. The amount of the sensing current is not decreased.

Consequently, the disorder in the magnetization of the free magnetic layer 60 due to heating can be suppressed, Barkhausen noise in the free magnetic layer 60 can be decreased, and the reading output of the thin-film magnetic head 6 can be improved.

Since the pair of bias layers 74 is disposed on both sides in the track width direction of the lower nonmagnetic conductive layer 62, the lower pinned magnetic layer 64, the lower antiferromagnetic layer 66, and the portions of the lower insulating layer 26, it is possible to reduce the thickness of the thin-film magnetic head 6, thus being suitable for gap narrowing.

Since the bias layers 74 are insulated from the lower shielding layer 29 by the lower insulating layer 26, the bias layers 74 can be composed of an antiferromagnetic conductive material as well as an antiferromagnetic insulating material. In particular, when the bias layers 74 are composed of the antiferromagnetic conductive material, since a relatively large exchange coupling magnetic field is produced at the interface with the free magnetic layer 60, it is possible to further reduce the thickness of the bias layers 74, and thus the gap of the thin-film magnetic head 6 can be further narrowed.

Since the pair of conductive layers 83 is disposed on both sides in the track width direction of the upper nonmagnetic conductive layer 61, the upper pinned magnetic layer 63, and the upper antiferromagnetic layer 65, and is in contact with the free magnetic layer 60, it is possible to reduce the thickness of the thin-film magnetic head 6, thus being suitable for gap narrowing, and also a sensing current can be efficiently applied to the free magnetic layer 60 from the conductive layers 83, thus increasing the reading output of the thin-film magnetic head 6.

Next, a seventh embodiment of the present invention will be described with reference to the drawings.

Figure 16:
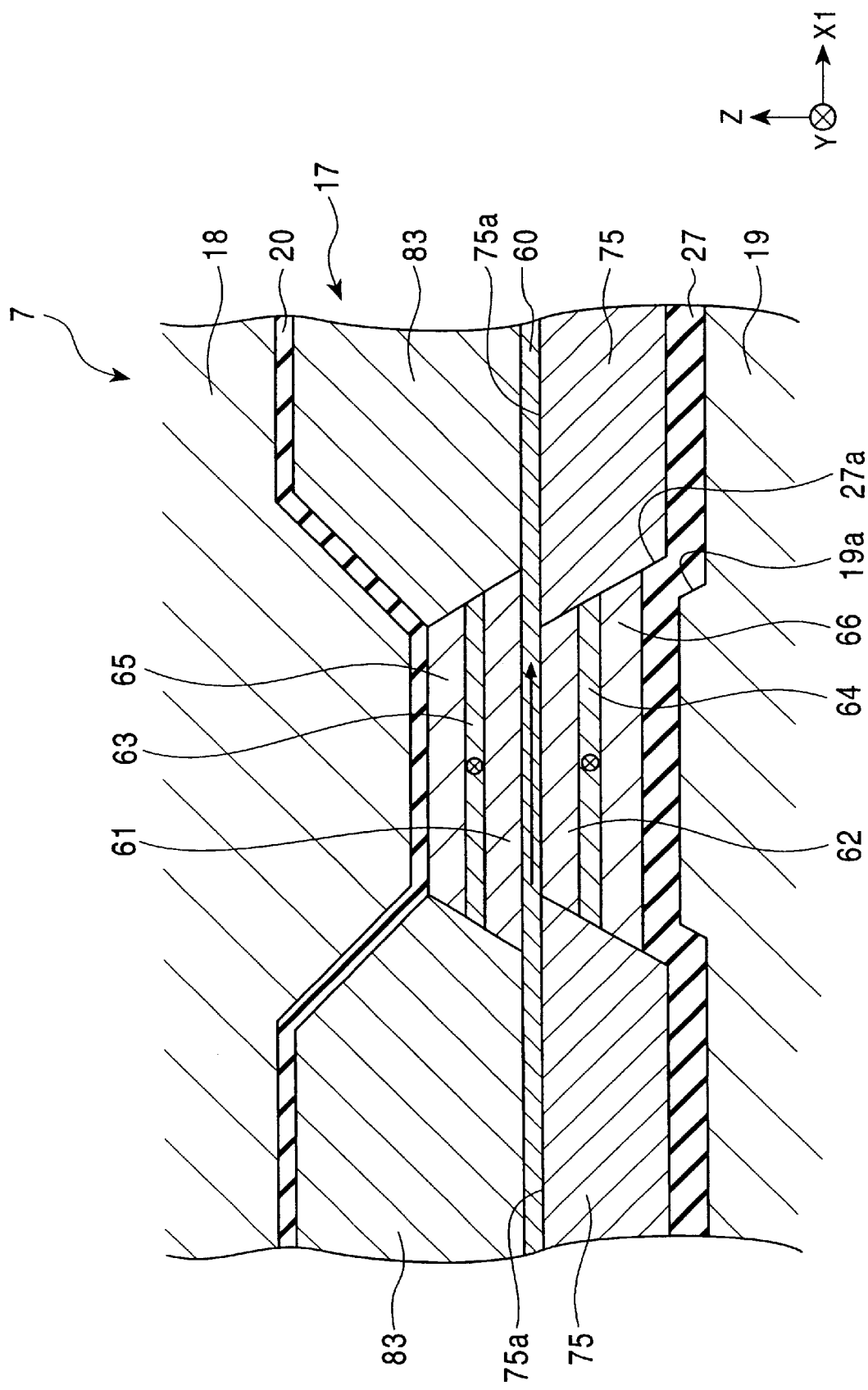
FIG. 16 is a sectional view which schematically shows a thin-film magnetic head, viewed from a surface facing a recording medium, in a seventh embodiment of the present invention.
Figure 17:
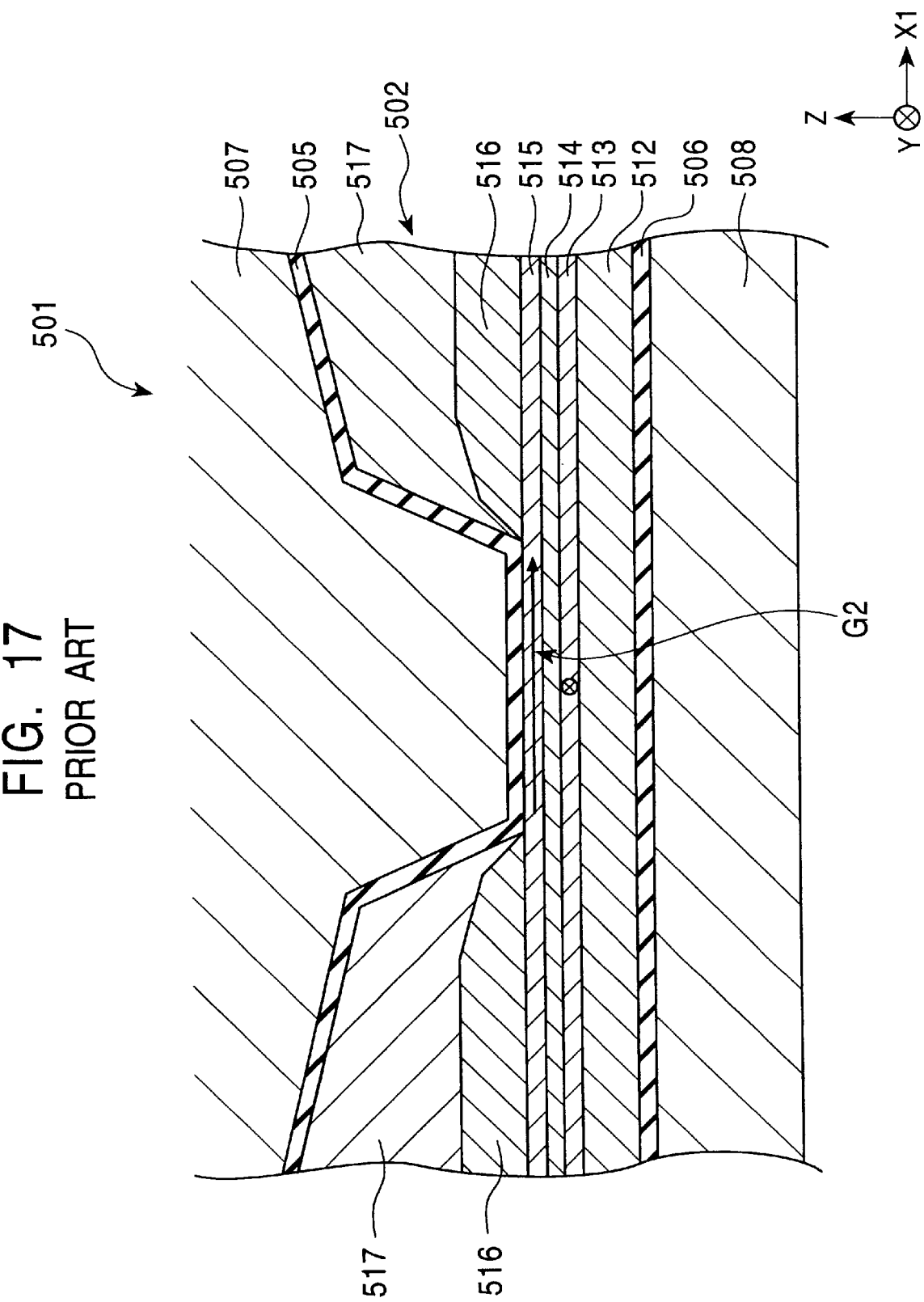
FIG. 17 is a sectional view which schematically shows a conventional thin-film magnetic head, viewed from a surface facing a recording medium.

FIG. 16 is a sectional view which schematically shows a thin-film magnetic head 7, viewed from the side of a magnetic recording medium, in a seventh embodiment of the present invention.

The thin-film magnetic head 7 shown in FIG. 16 includes a spin-valve thin-film magnetic element 17, and upper and lower insulating layers 20 and 27 and upper and lower shielding layers 18 and 19 deposited on both sides in the thickness direction of the spin-valve thin-film magnetic element 17, in a manner similar to that for the thin-film magnetic head 1 or 2 in the first or second embodiment.

The spin-valve thin-film magnetic element 17 is a dual spin-valve thin-film magnetic element, in which a nonmagnetic conductive layer, a pinned magnetic layer, and an antiferromagnetic layer are deposited in that order on each side in the thickness direction of a free magnetic layer, the same as the spin-valve thin-film magnetic element 16 described in the sixth embodiment. The spin-valve thin-film magnetic element 17 is also provided with conductive layers 83 for applying a sensing current to a free magnetic layer 60, and a pair of bias layers 75 for aligning the magnetization of the free magnetic layer 60.

The thin-film magnetic head 7 differs from the thin-film magnetic head 6 described in the sixth embodiment in that the lower shielding layer 19 is provided with a shielding protrusion 19a protruding toward the spin-valve thin-film magnetic element 17, the lower insulating layer 27 is deposited over the entire surface of the lower shielding layer 19, and the pair of bias layers 75 is disposed on both sides in the track width direction of the shielding protrusion 19a of the lower shielding layer 19.

Since the free magnetic layer 60, the upper and lower nonmagnetic conductive layers 61 and 62, the upper and lower pinned magnetic layers 63 and 64, the upper and lower antiferromagnetic layers 65 and 66, the upper insulating layer 20, and the upper shielding layer 18 shown in FIG. 16 have the same structures and are composed of the same materials as those of the free magnetic layer 60, the upper and lower nonmagnetic conductive layers 61 and 62, the upper and lower pinned magnetic layers 63 and 64, the upper and lower antiferromagnetic layers 65 and 66, the upper insulating layer 20, and the upper shielding layer 18 described in the sixth embodiment, a description thereof will be omitted.

As shown in FIG. 16, the lower shielding layer 19 is provided with the shielding protrusion 19a protruding toward the spin-valve thin-film magnetic element 17. The width in the X1 direction of the shielding protrusion 19a corresponds to the track width of the thin-film magnetic head 7. The lower insulating layer 27 is deposited on the lower shielding layer 19. The lower insulating layer 27 is deposited not only on the shielding protrusion 19a of the lower shielding layer 19 but also over the entire surface of the lower shielding layer 19. The lower insulating layer 27 is provided with an insulating protrusion 27a which corresponds to the shielding protrusion 19a of the lower shielding layer 19.

A pair of bias layers 75 is disposed on a side opposite to the Z direction in the thickness direction of the free magnetic layer 60, and is disposed on both sides in the X1 direction (the track width direction) of the shielding protrusion 19a of the lower shielding layer 19 and the insulating protrusion 27a of the lower insulating layer 27 and also on both sides in the X1 direction of the lower nonmagnetic conductive layer 62, the lower pinned magnetic layer 64, and the lower antiferromagnetic layer 66.

Upper surfaces 75a of the bias layers 75 are in contact with the free magnetic layer 60.

The bias layers 75 are insulated from the lower shielding layer 19 by the lower insulating layer 27.

As described above, portions of the pair of bias layers 75 are disposed on both sides in the X1 direction of the shielding protrusion 19a of the lower shielding layer 19 and the insulating protrusion 27a of the lower insulating layer 27, i.e., the pair of bias layers is embedded in the lower shielding layer 19 and the lower insulating layer 27.

The bias layers 75 are composed of an antiferromagnetic insulating material, an exchange coupling magnetic field (exchange anisotropic magnetic field) is produced at the interfaces between the free magnetic layer 60 and the bias layers 75, and the magnetization direction of the free magnetic layer 60 is aligned in the X1 direction by the exchange coupling magnetic field. As described above, the bias layers 75 align the free magnetic layer 60 in a single-domain state, thus suppressing Barkhausen noise.

The specific examples of the antiferromagnetic insulating material constituting the bias layers 75 and the thickness of the bias layers 75 are the same as those of the bias layers 70 described in the first embodiment.

In the thin-film magnetic head 7 described above, since the bias layers 75 are disposed on the side opposite to the Z direction in the thickness direction of the free magnetic layer 60 and the conductive layers 83 are disposed in the Z direction, when a sensing current is applied from the conductive layers 83 to the free magnetic layer 60, the sensing current does not flow in the bias layers 75 having a high resistivity, and thus heat generation of the spin-valve magnetic element 17 itself can be suppressed. The amount of the sensing current is not decreased.

Consequently, the disorder in the magnetization of the free magnetic layer 60 due to heating can be suppressed, Barkhausen noise in the free magnetic layer 60 can be decreased, and the reading output of the thin-film magnetic head 7 can be improved.

Since the pair of bias layers 75 is disposed on both sides in the track width direction of the lower nonmagnetic conductive layer 62, the lower pinned magnetic layer 64, the lower antiferromagnetic layer 66, and the lower shielding layer 19, it is possible to reduce the thickness of the thin-film magnetic head 7, thus being suitable for gap narrowing.

In the polishing process of the surface facing a recording medium in order to determine the gap depth of the thin-film magnetic head 7, if sagging occurs in a portion of the lower shielding layer 19, even if the sag reaches the bias layers 75, since the bias layers 75 are composed of the antiferromagnetic insulating material, short-circuiting does not occur between the lower shielding layer 19 and the bias layers 75.

Since the pair of conductive layers 83 is disposed on both sides in the track width direction of the upper nonmagnetic conductive layer 61, the upper pinned magnetic layer 63, and the upper antiferromagnetic layer 65 and is in contact with the free magnetic layer 60, it is possible to reduce the thickness of the thin-film magnetic head 7, thus being suitable for gap narrowing, and also the sensing current is efficiently applied from the conductive layers 83 to the free magnetic layer 60, thus increasing the reading output of the thin-film magnetic head 7.

As described above, in the thin-film magnetic head of the present invention, since the conductive layers are disposed on one side in the thickness direction of the free magnetic layer and the bias layers are disposed on the other side, when a sensing current is applied from the conductive layers to the free magnetic layer, the sensing current does not flow in the bias layers having a high resistivity, and it is possible to suppress the heat generation of the spin-valve thin-film magnetic element itself, and also the amount of the sensing current is not decreased.

Consequently, it is possible to prevent the magnetization of the free magnetic layer from becoming disordered due to heat generation, and also the reading output of the thin-film magnetic head can be improved.

Since the pair of bias layers is disposed on both sides in the track width direction of at least a portion of one of the insulating layers, it is possible to narrow the gap of the thin-film magnetic head, thus making the thin-film magnetic head suitable for higher recording densities.

In the thin-film magnetic head of the present invention, since the pair of bias layers composed of the antiferromagnetic insulating material is disposed on both sides of one of the insulating layers, it is possible to narrow the gap of the thin-film magnetic head.

In the thin-film magnetic head of the present invention, one of the insulating layers is provided with the insulating protrusion, the pair of bias layers is disposed on both sides in the track width direction of the insulating protrusion, and the bias layers are composed of the antiferromagnetic insulating material or the antiferromagnetic conductive material, and thus at least portions of the bias layers are embedded in the insulating layer, and it is possible to form the bias layers using the antiferromagnetic conductive material. Since the antiferromagnetic conductive material can provide a strong exchange coupling magnetic field, it is possible to reduce the thickness of the bias layers.

Accordingly, it is possible to further reduce the thickness of the thin-film magnetic head itself, thus enabling narrowing of the gap.

In the thin-film magnetic head of the present invention, one of the shielding layers is provided with the shielding protrusion, one of the insulating layers is disposed between the shielding protrusion and the spin-valve thin-film magnetic element, and the pair of bias layers is disposed on both sides in the track width direction of the shielding protrusion and the insulating layer, and thus at least portions of the bias layers are embedded in the insulating layer and the shielding layer, and it is possible to reduce the thickness of the thin-film magnetic head itself, thus enabling narrowing of the gap.

In the thin-film magnetic head of the present invention, one of the shielding layers is provided with the shielding protrusion, and one of the insulating layers is disposed between the shielding layer and the spin-valve thin-film magnetic element, and the pair of bias layers is disposed on both sides in the thickness direction of the shielding protrusion, and thus at least portions of the bias layers are embedded in the shielding layer, it is possible to reduce the thickness of the thin-film magnetic head, and the gap can be narrowed.

Since the bias layers are composed of the antiferromagnetic conductive material, which develops a high exchange coupling magnetic field, it is possible to reduce the thickness of the bias layers, and the thin-film magnetic head itself can be further reduced in thickness, thus enabling narrowing of the gap.

What is claimed is:

1. A thin-film magnetic head comprising:
   a spin-valve thin-film magnetic element comprising:
      a free magnetic layer;
      a nonmagnetic conductive layer in contact with the free magnetic layer, the nonmagnetic conductive layer being located on one side in the thickness direction of the free magnetic layer;
      a pinned magnetic layer in contact with the nonmagnetic conductive layer;
      an antiferromagnetic layer in contact with the pinned magnetic layer, the antiferromagnetic layer pinning the magnetization direction of the pinned magnetic layer;
      a pair of bias layers for aligning the magnetization direction of the free magnetic layer; and
      a pair of conductive layers for applying a sensing current to the free magnetic layer;
   a first insulating layer and a second insulating layer each deposited on a side in the thickness direction of the spin-valve thin-film magnetic element; and
   a first shielding layer and a second shielding layer in contact with the first insulating layer and the second insulating layer, respectively;
   wherein the pair of conductive layers is located on one side in the thickness direction of the free magnetic layer, and the pair of bias layers is located on the other side in the thickness direction of the free magnetic layer, is disposed on both sides in the track width direction of at least a portion of the second insulating layer, and is in contact with the free magnetic layer, and
   wherein the pair of bias layers is disposed on both sides in the track width direction of the second insulating layer, the pair of bias layers comprises an antiferromagnetic insulating material, and the second shielding layer is in contact with the pair of bias layers and the second insulating layer.

2. A thin-film magnetic head according to claim 1, wherein the antiferromagnetic insulating material is one of NiO and α-Fe$_2$O$_3$.

3. A floating-type magnetic head comprising a slider and a thin-film magnetic head according to claim 1.

4. A thin-film magnetic head according to claim 1, wherein the pair of conductive layers is located on both sides in the track width direction of the nonmagnetic conductive layer, the pinned magnetic layer, and the antiferromagnetic layer, and the pair of conductive layers is in contact with the free magnetic layer.

5. A thin-film magnetic head comprising:
   a spin-valve thin-film magnetic element comprising:
      a free magnetic layer;
      a nonmagnetic conductive layer in contact with the free magnetic layer, the nonmagnetic conductive layer being located on one side in the thickness direction of the free magnetic layer;
      a pinned magnetic layer in contact with the nonmagnetic conductive layer;
      an antiferromagnetic layer in contact with the pinned magnetic layer, the antiferromagnetic layer pinning the magnetization direction of the pinned magnetic layer;

a pair of bias layers for aligning the magnetization direction of the free magnetic layer; and a pair of conductive layers for applying a sensing current to the free magnetic layer;

a first insulating layer and a second insulating layer each deposited on a side in the thickness direction of the spin-valve thin-film magnetic element; and a first shielding layer and a second shielding layer in contact with the first insulating layer and the second insulating layer, respectively;

wherein the pair of conductive layers is located on one side in the thickness direction of the free magnetic layer, and the pair of bias layers is located on the other side in the thickness direction of the free magnetic layer, is disposed on both sides in the track width direction of at least a portion of the second insulating layer, and is in contact with the free magnetic layer, and wherein the second shielding layer is provided with a shielding protrusion protruding toward the spin-valve thin-film magnetic element, the second insulating layer is disposed between the shielding protrusion and the spin-valve thin-film magnetic element, the pair of bias layers is disposed on both sides in the track width direction of the shielding protrusion and the second insulating layer, and the pair of bias layers comprises an antiferromagnetic insulating material.

6. A thin-film magnetic head according to claim 5, wherein the pair of conductive layers is located on both sides in the track width direction of the nonmagnetic conductive layer, the pinned magnetic layer, and the antiferromagnetic layer, and the pair of conductive layers is in contact with the free magnetic layer.

7. A thin-film magnetic head according to claim 5, wherein the antiferromagnetic insulating material is one of NiO and $\alpha$-$Fe_2O_3$.

8. A floating-type magnetic head comprising a slider and a thin-film magnetic head according to claim 5.

9. A thin-film magnetic head comprising:

a spin-valve thin-film magnetic element comprising:
a free magnetic layer;
a nonmagnetic conductive layer in contact with the free magnetic layer, the nonmagnetic conductive layer being located on one side in the thickness direction of the free magnetic layer;

a pinned magnetic layer in contact with the nonmagnetic conductive layer;

an antiferromagnetic layer in contact with the pinned magnetic layer, the antiferromagnetic layer pinning the magnetization direction of the pinned magnetic layer;

a pair of bias layers for aligning the magnetization direction of the free magnetic layer; and a pair of conductive layers for applying a sensing current to the free magnetic layer;

a first insulating layer and a second insulating layer each deposited on a side in the thickness direction of the spin-valve thin-film magnetic element; and a first shielding layer and a second shielding layer in contact with the first insulating layer and the second insulating layer, respectively;

wherein the pair of conductive layers is located on one side in the thickness direction of the free magnetic layer, and the pair of bias layers is located on the other side in the thickness direction of the free magnetic layer, is disposed on both sides in the track width direction of at least a portion of the second insulating layer, and is in contact with the free magnetic layer, and wherein the pair of bias layers is disposed on both sides in the track width direction of the second insulating layer, the pair of bias layers comprises an antiferromagnetic insulating material, the antiferromagnetic insulating material being one of NiO and $\alpha$-$Fe_2O_3$, and the second shielding layer is in contact with the pair of bias layers and the second insulating layer.

10. A thin-film magnetic head according to claim 9, wherein the pair of conductive layers is located on both sides in the track width direction of the nonmagnetic conductive layer, the pinned magnetic layer, and the antiferromagnetic layer, and the pair of conductive layers is in contact with the free magnetic layer.

11. A floating-type magnetic head comprising a slider and a thin-film magnetic head according to claim 9.

* * * * *